US012393639B2

(12) United States Patent
Chishi et al.

(10) Patent No.: US 12,393,639 B2
(45) Date of Patent: Aug. 19, 2025

(54) INTERACTIVE SEARCH EXPLORATION

(71) Applicant: Microsoft Technology Licensing, LLC, Redmond, WA (US)

(72) Inventors: Thuli Nitoshe Chishi, Hyderabad (IN); Kishor Chamua, Hyderabad (IN); Shveta Verma, Hyderabad (IN); Rajendra Bhimsen Shinde, Hyderabad (IN); Sushil Kumar Chordia, Hyderabad (IN); Amit Dangwal, Hyderabad (IN); Deepak Achuthan Menon, Hyderabad (IN); Harendra Prasad Baji, Hyderabad (IN); Aditi Gulati, Hyderabad (IN); Akash Shivaji Padmane, Hyderabad (IN); Srishti Srivastava, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 18/329,195

(22) Filed: Jun. 5, 2023

(65) Prior Publication Data
US 2024/0403377 A1    Dec. 5, 2024

(51) Int. Cl.
*G06F 16/954* (2019.01)
*G06F 3/0481* (2022.01)
(Continued)

(52) U.S. Cl.
CPC .......... *G06F 16/954* (2019.01); *G06F 3/0481* (2013.01); *G06F 16/9538* (2019.01); *G06F 3/04842* (2013.01)

(58) Field of Classification Search
CPC .. G06F 16/954; G06F 16/9538; G06F 3/0481; G06F 3/04842
(Continued)

(56) References Cited

U.S. PATENT DOCUMENTS 7,992,102 B1 * 8/2011 De Angelo ......... G06F 3/04886
715/834
8,521,773 B2    8/2013 Evans et al.
(Continued)

OTHER PUBLICATIONS

"YouTube™ on Hover", Retrieved from: https://www.youtube.com/watch?v=uSRpHnYmZjU&t=1s, Retrieved Date: Mar. 30, 2023, 2 Pages.

*Primary Examiner* — Joshua Bullock
(74) *Attorney, Agent, or Firm* — Shook, Hardy & Bacon L.L.P.

(57) ABSTRACT

Methods, computer systems, computer-storage media, and graphical user interfaces are provided for providing an interactive search exploration tool. In embodiments, an interactive search exploration tool is presented via a graphical user interface. The tool may include a primary topic, indicating the search query, that is positioned at a center of the interactive search exploration tool. The tool may also include distance indicators indicating extents of relatedness to the primary topic. The distance indicators can be represented as concentric shapes positioned around the primary topic at varying distances. The tool can also include a related topic(s) positioned around the primary topic. The related topic is positioned in proximity to a distance indicator that corresponds with an extent of relatedness of the related topic to the primary topic. Thereafter, in response to a selection of the related topic, a topic content snippet that provides a representation of the related topic is presented.

20 Claims, 15 Drawing Sheets

(51) Int. Cl.
*G06F 16/9538* (2019.01)
*G06F 3/04842* (2022.01)

(58) Field of Classification Search
USPC .......................................................... 707/706
See application file for complete search history.

(56) References Cited

U.S. PATENT DOCUMENTS

| | | | | |
|---|---|---|---|---|
| 8,949,215 | B2* | 2/2015 | Wang | G06F 16/951 |
| | | | | 715/848 |
| 9,690,831 | B2* | 6/2017 | Isaacs | G06F 16/332 |
| 9,883,250 | B2 | 1/2018 | Chai et al. | |
| 10,558,657 | B1* | 2/2020 | Cheng | G06F 16/93 |
| 10,817,129 | B2 | 10/2020 | Reid et al. | |
| 10,936,163 | B2* | 3/2021 | Wohlstadter | G16C 20/10 |
| 10,984,057 | B2* | 4/2021 | Westbrook | G06F 3/04886 |
| 11,561,987 | B1* | 1/2023 | Sager | G06F 16/906 |
| 11,615,130 | B1* | 3/2023 | Hu | G06Q 10/101 |
| | | | | 707/737 |
| 11,893,505 | B1* | 2/2024 | Fleming | G06F 16/93 |
| 12,020,340 | B2* | 6/2024 | Milles | G06F 16/335 |
| 2003/0187836 | A1* | 10/2003 | Ikeda | G06F 16/54 |
| | | | | 707/E17.02 |
| 2010/0153324 | A1* | 6/2010 | Downs | G06F 40/258 |
| | | | | 706/55 |
| 2011/0047014 | A1* | 2/2011 | De Angelo | G06F 3/0482 |
| | | | | 715/810 |
| 2013/0090918 | A1* | 4/2013 | Lee | G06F 16/35 |
| | | | | 704/9 |
| 2014/0109002 | A1* | 4/2014 | Kimball | G06F 3/04886 |
| | | | | 715/830 |
| 2014/0279257 | A1* | 9/2014 | Fine | G06F 16/34 |
| | | | | 705/26.62 |
| 2017/0322983 | A1* | 11/2017 | Anderson | G06F 3/0482 |
| 2019/0318009 | A1* | 10/2019 | Miller | G06F 16/248 |
| 2023/0409647 | A1* | 12/2023 | Fleming | G06N 20/00 |

* cited by examiner

FIG. 7

INTERACTIVE SEARCH EXPLORATION

BACKGROUND

Search results presented in response to a search query are generally presented in a linear order, with the most relevant search result presented at the top. To explore information, the user may select to view a search result and then return to the search results page to view other information. In some cases, a user may input or select a new search query to obtain a different set of search results to explore. Such a linear approach directs users to a particular flow of search results that may be biased and limited in perspectives. For a user desiring to learn and explore, unbiased access to information may be valuable, as opposed to a single narrative that is oftentimes created by the linear nature of conventional search implementations. Further, it can be very time consuming to review content associated with such search results to identify the desired information or to explore information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things facilitating interactive search exploration. Among other things, embodiments described herein efficiently and effectively surface topics related to a primary topic in an interactive manner. In this way, a user can explore various information in a more efficient manner and, oftentimes, view perspectives that would be otherwise uncovered under various layers via a conventional search approach. In accordance with embodiments described herein, an interactive search exploration tool is generated and provided enabling such efficient exploration and an interactive way of researching and exploring via a search engine. In particular, the interactive search exploration tool visually provides topics related to a primary topic, such as input search query, in proximity relative to an extent of relatedness to the primary topic. In this way, a user may have a broader view of topics related to a primary topic.

BRIEF DESCRIPTION OF DRAWINGS

The technology described herein is described in detail below with reference to the attached drawing figures, wherein:

FIG. 7 provides an example graphical user interface illustrating a search results page, in accordance with aspects of the technology described herein;

DETAILED DESCRIPTION

Figure 1:
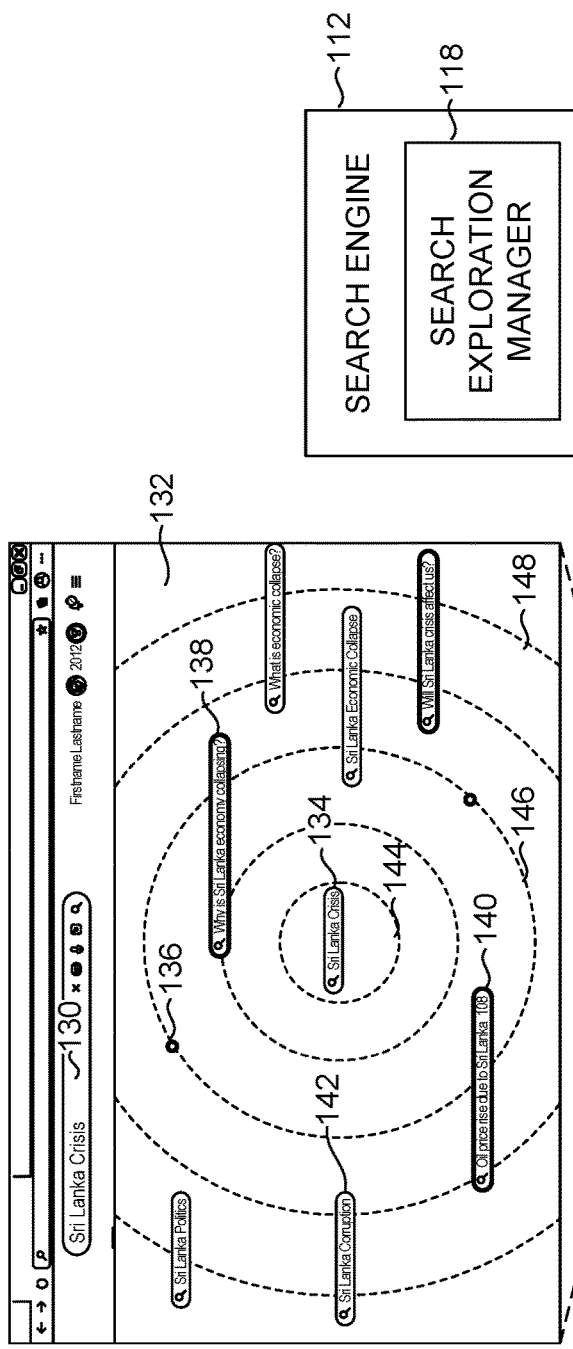
FIG. 1 is a block diagram of an exemplary system for generating and providing interactive search exploration tools, suitable for use in implementing aspects of the technology described herein.
Figure 1:
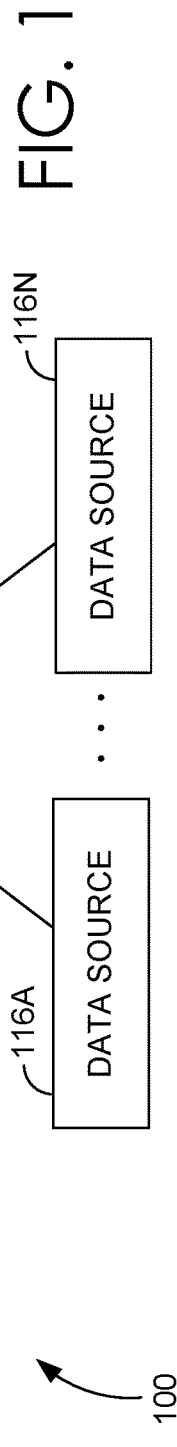

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Search engines have various models that operate to provide a user with search results relevant to an input search query. The search results are generally presented in a linear order, with the most relevant search result presented at the top. To explore information, the user may select to view a search result and then return to the search results page to view other information. In some cases, a user may input or select a new search query to obtain a different set of search results to explore. A linear approach of presenting search results generally directs users to a particular flow of search results that may be biased and limited in perspectives (e.g., search engine may rank results that may create biased perspective). For a user desiring to learn and explore, unbiased access to information is a latent need, as opposed to a single narrative that is oftentimes created by the linear nature of conventional search implementations. Further, it can be very time consuming to review content associated with such search results to identify the desired information or to explore information. Moreover, in many cases, the user may not find the desired information or may wish to explore further, thereby requiring the user to continue searching for the desired information by submitting a new search query.

As obtaining desired information or exploring content may be time-consuming and burdensome, particularly when multiple search iterations are performed, computing and networking resources are unnecessarily consumed to facilitate the search. For instance, computer input/output (I/O) operations are unnecessarily multiplied in an effort to identify particular information. As one example, each time a search query is issued, the information must be searched for and located at a particular computer storage address of a storage device. The searching and locating of the relevant information is computationally expensive and increases latency. In this regard, an unnecessary quantity of queries executed to find information can unnecessarily result in decreased throughput and increased network latency, thereby increasing usage of computing and network resources.

Further, such repetitive search operations also often result in packet generation costs that adversely affect computer network communications. Each time a query is issued, for example, the contents or payload of the query is typically supplemented with header information or other metadata within a packet in TCP/IP and other protocol networks. Accordingly, when the number of queries increases to obtain desired data, as is the case with existing technologies, there are throughput and network latency costs by repetitively generating this metadata and sending it over a computer network.

Accordingly, embodiments described herein are directed to facilitating interactive search exploration. Among other things, embodiments described herein efficiently and effectively surface topics related to a primary topic in an interactive manner. In this way, a user can explore various information in a more efficient manner and, oftentimes, view perspectives that would be otherwise uncovered under various layers via a conventional search approach. In accordance with embodiments described herein, an interactive search exploration tool is generated and provided enabling such efficient exploration and an interactive way of researching and exploring via a search engine. In particular, the interactive search exploration tool visually provides topics related to a primary topic, such as input search query, in proximity relative to an extent of relatedness to the primary topic. In this way, a user may have a broader view of topics related to a primary topic. By visually and appropriately grouping related topics, a user can be provided with a better understanding of the relevant context of information that is available to them, thereby reducing time and computing resources used to search and/or explore information.

As described, embodiments described herein generate an interactive search exploration tool that enables a user to view topics (e.g., general topics and/or focused topics) related to a primary topic (e.g., a search query input or selected by a user). To generate an interactive search exploration tool, related topics relevant to a primary topic and an extent of relatedness to the primary topic are identified. The interactive search exploration tool can then be generated to present the related topics with a distance from the primary topic that represents extent of relatedness to the primary topic. For example, topics more related or relevant to a primary topic are positioned closer to the primary topic than topics less related or relevant to the primary topic. As such, a user can efficiently and effectively view topics related to the primary topic and visually recognize the extent of relatedness to the primary topic.

In one implementation, the interactive search exploration tool provides the primary topic in the center of the tool. The interactive search exploration tool can include distance indicators around the primary topic. Distance indicators generally provide an indication of an extent or distance of relatedness to a primary topic. In some cases, distance indicators are represented using concentric shapes, such as rings or circles, positioned around the primary topic. Based on the extent of relatedness to the primary topic, the related topics can be positioned accordingly among the distance indicators.

Further, the user can interact with the search exploration tool to explore topics and surface new topics. In particular, a user may select a related topic, for example, in the form of a general topic or a focused topic. In some cases, selection of a related topic provides more information associated with the related topic (e.g., a search result or information associated with a search result that would result based on the related topic). Alternatively or additionally, selection of a related topic can transition the related topic to being the primary topic. For example, the related topic may be relocated to the center of the search exploration tool and be the focal point of the exploration. Further, selection of a related topic may result in the related topic being an input into a search query input box to effectuate a search using the related topic. Such interactions can be selectively implemented or implemented in combination. As can be appreciated, different types of interactions can initiate different types of events in association with a related topic. For instance, a right click or hover over a related topic may result in more information being presented, a left click over a related topic may result in transitioning the related topic to a primary topic, and selection of an icon (e.g., a search icon) in association with a related topic may result in the related topic being an input into a search query box to effectuate a search using the related topics. Various interactions with search exploration tool are contemplated and are not intended to be limiting herein.

Advantageously, providing the interactive search exploration tool in an efficient manner enables a user engaging in a search to have a more clear view into related topics or topics without having to manually track down the desired data using various queries and review of corresponding search results. Further, the exploration opportunities offered via the interactive search exploration tool provide new or additional insights related to a primary topic that might otherwise be unrecognized by the user.

Overview of Exemplary Environments for Managing Interactive Search Exploration Tools Referring initially to FIG. 1, a block diagram of an exemplary network environment 100 suitable for use in implementing embodiments described herein is shown. Generally, the system 100 illustrates an environment suitable for facilitating interactive search exploration. Among other things, embodiments described herein efficiently and effectively surface topics related to a primary topic in an interactive manner. A topic generally refers to a subject or theme. A primary topic generally refers to a topic that is of interest for identifying and/or viewing related topics. In some embodiments described herein, a primary topic is provided or represented in the form of a search query, such as a user search query. A related topic generally refers to a topic that is related or relevant to a primary topic. A related topic can be identified in various ways, some of which are described herein. A related topic can also be represented in a number of manners. In this regard, a related topic may be a general topic or a focused topic. A general topic refers to a topic that is more general or broader, while a focused topic refers to a topic that is more specific. In some cases, a general topic may encompass a set of one or more focused topics. In embodiments described herein, a topic, such as a focused topic, can be represented in the form of a query. In this way, the focused topic may be a query related to or associated with the primary topic (e.g., a query input or selected by a user).

Advantageously, embodiments described herein generate an interactive search exploration tool that enables a user to view topics (e.g., general topics and/or focused topics) related to a primary topic (e.g., a search query input or selected by a user). To generate an interactive search exploration tool, related topics relevant to a primary topic and an extent of relatedness to the primary topic are identified. The interactive search exploration tool can then be generated that presents the related topics with a distance from the primary topic that represents extent of relatedness to the primary topic. For example, topics more related or relevant to a primary topic are positioned closer to the primary topic than topics less related or relevant to the primary topic. As such, a user can efficiently and effectively view topics related to the primary topic and visually recognize the extent of relatedness to the primary topic.

In one implementation, the interactive search exploration tool provides the primary topic in the center of the tool. The interactive search exploration tool can include distance indicators around the primary topic. Distance indicators generally provide an indication of an extent or distance of relatedness to a primary topic. In some cases, distance indicators are represented using concentric shapes, such as rings or circles, positioned around the primary topic. Based on the extent of relatedness to the primary topic, the related topics can be positioned accordingly among the distance indicators.

Further, the user can interact with the search exploration tool to explore topics and surface new topics. In particular, a user may select a related topic, for example, in the form of a general topic or a focused topic. In some cases, selection of a related topic provides more information associated with the related topic (e.g., a search result or information associated with a search result that would result based on the related topic). Alternatively or additionally, selection of a related topic can transition the related topic to being the primary topic. For example, the related topic may be relocated to the center of the search exploration tool and be the focal point of the exploration. Further, selection of a related topic may result in the related topic being an input into a search query input box to effectuate a search using the related topic. Such interactions can be selectively implemented or implemented in combination. As can be appreciated, different types of interactions can initiate different types of events in association with a related topic. For instance, a right click or hover over a related topic may result in more information being presented, a left click over a related topic may result in transitioning the related topic to a primary topic, and selection of an icon (e.g., a search icon) in association with a related topic may result in the related topic being an input into a search query box to effectuate a search using the related topics. Various interactions with search exploration tool are contemplated and are not intended to be limiting herein.

The network environment 100 includes a user device 110a-110n (referred to generally as user device(s) 110), a search engine 112, a data store 114, and data sources 116a-116n (referred to generally as data source(s) 116). The user device 110a-110n, the search engine 112, the data store 114, and the data sources 116a-116n can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110a-110n and data sources 116a-116n may be in communication with the search engine 112 via a mobile network or the Internet, and the search engine 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the search engine 112 and/or data store 114 may be integrated with the user device 110. For instance, a portion of the search engine 112 may be integrated with a server (e.g., search engine service) in communication with a user device, while another portion of the search engine 112 may be integrated with the user device (e.g., via application 120).

The user device 110 can be any kind of computing device capable of facilitating generating and/or providing an interactive search exploration tool. For example, in an embodiment, the user device 110 can be a computing device such as computing device 1500, as described above with reference to FIG. 15. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating generating and/or providing an interactive search exploration tool. In embodiments, the application may be a search application that includes functionality to initiate and/or perform searches. In particular, a search application may be used to input a search and, in response, obtain a set of search results. Further, as described herein, an interactive search exploration tool can be presented, for example, in association with the search results, to enable the user to perform a more exploratory search in an efficient and effective manner. In some implementations, the application(s) comprises a web application, which can run in a web browser, and could be hosted at least partially server-side (e.g., via search engine 112). In addition, or instead, the application(s) can comprise a dedicated application. In some cases, the application is integrated into the operating system (e.g., as a service). As one specific example application, application 120 may be a search tool that provides search results in response to search queries.

User device 110 can be a client device on a client-side of operating environment 100, while search engine 112 can be on a server-side of operating environment 100. Search engine 112 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110 and/or search engine 112 to remain as separate entities.

In an embodiment, the user device 110 is separate and distinct from the search engine 112, the data store 114, and the data sources 116 illustrated in FIG. 1. In another embodiment, the user device 110 is integrated with one or more illustrated components. For instance, the user device 110 may incorporate functionality described in relation to the search engine 112. For clarity of explanation, embodiments are described herein in which the user device 110, the search engine 112, the data store 114, and the data sources 116 are separate, while understanding that this may not be the case in various configurations contemplated.

As described, a user device, such as user device 110, can facilitate generating and/or providing an interactive search exploration tool. The interactive search exploration tool enables a user to explore various search topics relevant or related to a primary topics, such as an input or selected search query. For example, assume a user inputs a search query, the interactive search exploration tool provides related topics the user can explore. The interactive search exploration tool provides the related searches, or topics, in a visually appealing manner that provides information at a glance. For instance, the related topics are presented relative to (e.g., around) a primary topic with a placement that corresponds with an extent of relatedness to the primary topic. In this way, a related topic very closely related to the primary topic is visually presented near the primary topic, whereas a related topic less related to the primary topic is visually presented further from the primary topic. Further, the related topics may be interacted with to refocus and further explore topics, to view information associated with the topics, and/or to initiate a search using the topics.

A user device 110, as described herein, is generally operated by an individual or entity interested in performing a search and/or viewing information. In some cases, generation and/or provision of an interactive search exploration tool may be initiated at the user device 110. For example, in some cases, a user may navigate to a search service and input or select a search query. Based on initiation of the search query, generation and/or presentation of an interactive search exploration tool relevant to the search query may be initiated. Alternatively or additionally, a user may specifically select to generate and/or present an interactive search exploration tool. For example, in association with initiating a search and/or view search results, a search exploratory tool indicator may be selected to initiate generation and/or presentation of a corresponding interactive search exploration tool. By way of example only, a search exploratory tool indicator may be presented in connection with an initial search page in which a query can be input or in connection with a search results page presenting a set of search results for an input query. A search exploratory tool indicator may be in any form, such as an icon or text. Selecting the search exploratory tool indicator, or portion thereof, can result in an interactive search exploratory tool being presented via a display screen of the user device 110.

Generating and/or providing an interactive search exploration tool may be initiated and/or presented via an application 120 operating on the user device 110. In this regard, the user device 110, via an application 120, might allow a user to initiate a generation or presentation of an interactive search exploration tool. The user device 110 can include any type of application and may be a stand-alone application, a mobile application, a web application, or the like. In some cases, the functionality described herein may be integrated directly with an application or may be an add-on, or plug-in, to an application. One example of an application that may be used to initiate and/or present interactive search exploration tools is Bing® provided by Microsoft®.

The user device 110 can communicate with the search engine 112 to initiate generation and/or presentation of an interactive search exploration tool. In embodiments, for example, a user may utilize the user device 110 to initiate generation of an interactive search exploration tool via the network 122. For instance, in some embodiments, the network 122 might be the Internet, and the user device 110 interacts with the search engine 112 to initiate generation of an interactive search exploration tool. In other embodiments, for example, the network 122 might be an enterprise network associated with an organization. It should be apparent to those having skill in the relevant arts that any number of other implementation scenarios may be possible as well.

With continued reference to FIG. 1, the search engine 112 can be implemented as server systems, program modules, virtual machines, components of a server or servers, networks, and the like. At a high level, the search engine 112 manages searches. In this regard, in association with obtaining a search query, the search engine 112 can search for relevant information, rank the information, and provide the information as search results for presentation in response to the search query. The search results may be presented in any number of ways. In some cases, for example, a search result may include a link or URL that, if selected, navigates the user to the information. The search result may include additional or alternative information, such as an image, a video, a snippet of summary information or relevant information, etc. Generally, the search engine 112 can determine search results using any number of devices. Such search engine 112 may communicate with application 120 operating on user device 110 to provide back-end services to application 120.

In accordance with embodiments described herein, the search engine 112 includes a search exploration manager 118. The search exploration manager 118 is generally configured to generate and/or provide an interactive search exploration tool. To do so, the search exploration manager 118 generally identifies topics and relatedness of topics. Topic identification and relatedness can be performed in various ways. For example, web documents and search queries can be analyzed to identify topics and/or determine relatedness of topics. In embodiments, topic identification and/or relatedness can be determined using data accessed via data sources 116. For example, data source 116A may include web documents and data source 116N may include a log of search queries, both of which may be accessed to identify topics or relatedness thereof. The topics and relatedness can be stored, for example, in data store 114 for subsequent use.

Thereafter, in response to obtaining a search query input to initiate a search, the search exploration manager 118 can generate the interactive search exploration tool for providing to the user device for display. The interactive search exploration tool enables a user to explore various search topics relevant or related to a primary topics, such as an input or selected search query.

For example, as shown in FIG. 1, assume a user inputs a search query, the interactive search exploration tool 132 provides related searches the user can explore. The interactive search exploration tool 132 provides the related topics in a visually appealing manner that provides information at a glance. For instance, the related topics are presented relative to (e.g., around) a primary topic 134 (e.g., the input search query) with a placement that corresponds with an extent of relatedness to the primary topic. In this way, a related topic very closely related to the primary topic is visually presented near the primary topic, whereas a related topic less related to the primary topic is visually presented further from the primary topic. In this example, more general related topics may be represented as nodes, such as node 136, that, if selected, may provide further information. Focused topics, such as focused topics 138, 140, and 142 are represented as queries. In this example, as focused topic 138 is more related to the primary topic 134 than focused topic 142 is related to the primary topic 134, focused topic 138 is positioned closer to the primary topic 134. The concentric rings, such as rings 144, 146, and 148 indicate different extents of relatedness to provide an efficient manner for identifying relatedness of topics to the primary topic. Further, the related topics may be interacted with to refocus and further explore topics, to view information associated with the topics, and/or to initiate a search using the topics, as described in more detail herein.

Figure 2:
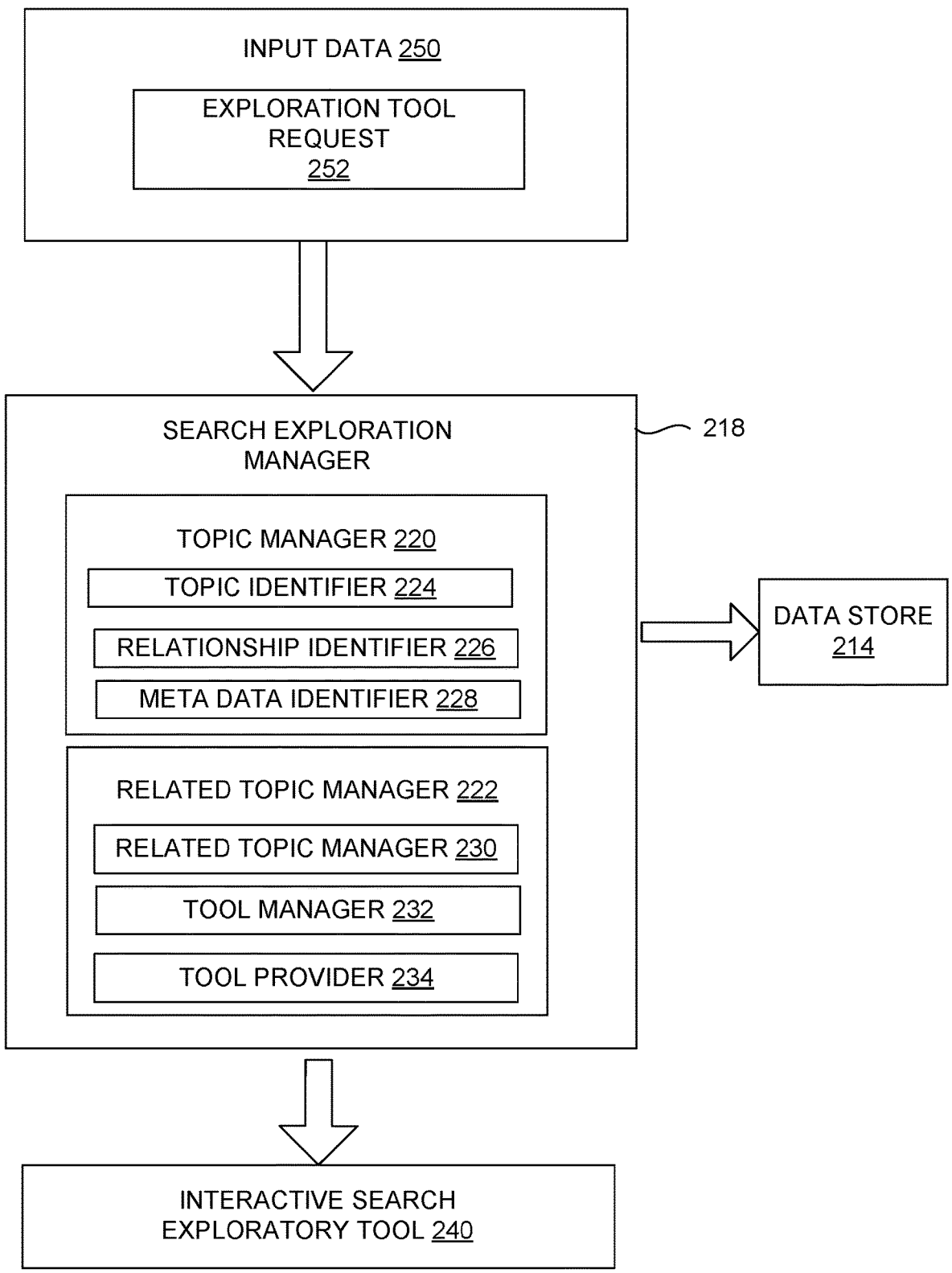
FIG. 2 is an example implementation for facilitating generating and providing interactive search exploration tools, via a search exploration manager, in accordance with aspects of the technology described herein.

Turning now to FIG. 2, FIG. 2 illustrates an example implementation for generating and/or providing an interactive search exploration tool, via search exploration manager 218. The search exploration manager 218 can communicate with the data store 214. The data store 214 is configured to store various types of information accessible by the search exploration manager 218 or other server. In embodiments, data sources (such as data sources 116 of FIG. 1), user devices (such as user devices 110 of FIG. 1), and/or search engine (such as search engine 112 of FIG. 1) can provide data to the data store 214 for storage, which may be retrieved or referenced by any such component. As such, the data store 214 may store web documents, search logs, topics, topic relatedness, or the like.

In operation, the search exploration manager 218 is generally configured to manage generating and/or providing interactive search exploration tools. In embodiments, the search exploration manager 218 includes a topic manager 220 and a related topic manager 222. According to embodiments described herein, the search exploration manager 218 can include any number of other components not illustrated. In some embodiments, one or more of the illustrated components 220 and 222 can be integrated into a single component or can be divided into a number of different components. Components 220 and 222 can be implemented on any number of machines and can be integrated, as desired, with any number of other functionalities or services.

The topic manager 220 is generally configured to identify various topics and relationships therebetween. In particular, the topic manager 220 can identify topics and relationships for subsequent use in identifying related topics. In one embodiment, the topic manager 220 includes a topic identifier 224, a relationship identifier 226, and meta data identifier 228. According to embodiments described herein, the topic identifier 224, the relationship identifier 226, and the meta data identifier 228 can include any number of other components not illustrated. In some embodiments, one or more of the illustrated components 224, 226, and 228 can be integrated into a single component or can be divided into a number of different components.

The topic identifier 224 is generally configured to identify topics. Topics may be identified with various specificities. For example, in some cases, broader or more general topics may be identified (e.g., general topics). In other cases, more specific or focused topics may be identified (e.g., focused topics). As can be appreciated, topics identified may be as granular as users are interested (e.g., based on web documents and query intent). Further, any number of topics may be identified. The topic identifier 224 may identify topics in any number of ways. In embodiments, the topic identifier 224 identifies topics in various ways in an effort to identify topics that may be related to any given query.

In one example, the topic identifier 224 may use web documents to identify topics. Web documents may include a website or a webpage and be in any form, such as HTML files. Web documents may be accessed via a uniform resource locator (URL). In embodiments, the topic identifier 224 can access web documents and identify topics therefrom.

Various aspects of a web document may be used to identify topics. For example, web documents may include an inherent HTML structure that defines order and top-level topics. In some cases, aspects of a web document (e.g., elements of HTML) that may be used to identify topics include headings and/or subheadings of a web document (e.g., web page), links, meta tags, menu items, web tables, rich or structured graphs encoded in web documents, etc. In this regard, headings/subheadings, links, meta tags, menu items, web tables, etc. may be analyzed and used to extract topics. Headings and/or subheadings of a web document can indicate main topics and categories associated with the web document. Using structure of the headings (e.g., H1, H2, H3) and/or content of the headings, the topic identifier 224 can infer the main intents of the page and, as such, topics can be identified. Links within web documents can provide information about topics that may be of interest. As such, the topic identifier 224 may identify topics associated with links in web documents. Meta tags can also provide information about topics and intents of a web document. For example, a "description" meta tag can provide a summary of main content of a web document. As another example, a "keyword" meta tag can provide information about a main topic associated with a web page. Menu items of a web document can provide an indication of a main section and/or category associated with the web document(s) (e.g., a website). Similarly, web tables can provide structured information about various topics or products. As such, the topic identifier 224 may access web documents (e.g., from a data source, such as data source 116 of FIG. 1), and analyze various aspects, such as headings, links, meta tags, menu items, and/or web tables.

The topic identifier 224 may analyze web document features associated with any number of web documents. In one embodiment, web documents to analyze may be based on user submitted queries. For example, for a prior submitted query, the query is associated with a top N URLs (e.g., using a search result ranker). As such, for a prior submitted query, web documents, or a particular set of web documents, associated with the top results are analyzed. For instance, a set of the top ten web documents associated with a query may be analyzed. The queries for which web documents are analyzed may be any identified queries, top queries (e.g., queries more frequently submitted), recent queries (e.g., queries submitted within a recent time frame, such as one month), etc. Although an example is provided for determining or selecting web documents to analyze, as can be appreciated, any other method may be employed to select web documents for analysis. For instance, web documents may be randomly selected for analysis.

Figure 3A:
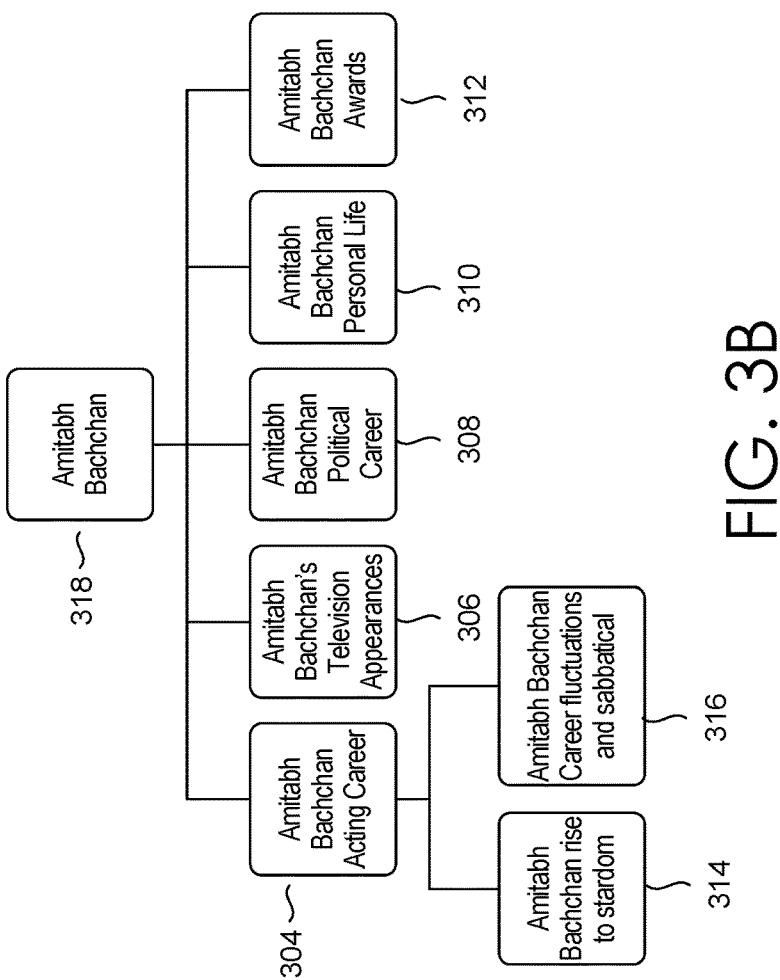
FIGS. 3A-3B provide an example of analyzing web document features to identify topics, in accordance with embodiments of the present technology.
Figure 3B:
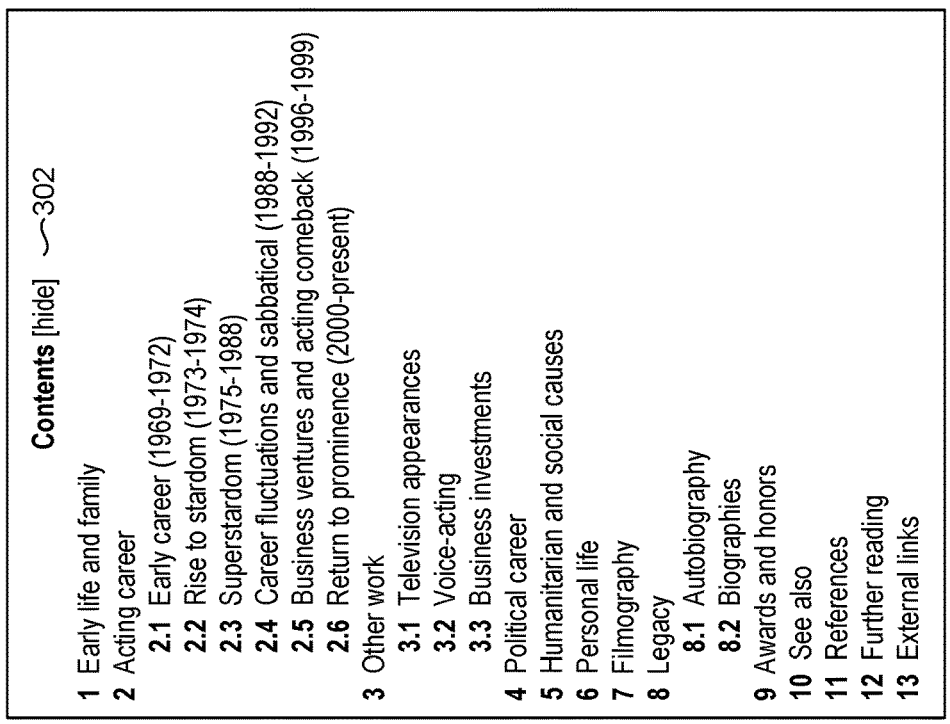

By way of example only, assume a query, "Amitabh Bachchan," is identified and a top result associated with the query is a web document identified via a link "Amitabh Bachchan Filmography—Wikipedia." Such a web document may include various structures, such as meta tags, web tables, menus, headings, etc. With reference to FIG. 3A, assume table of contents 302 associated with the web document is analyzed. The table of contents 302 may include HTML tags for lists. The topic identifier 224 may analyze the table of contents 302, or meta data associated therewith, and identify or extract various topics, including topics indicating acting career 304, television appearances 306, political career 308, personal life 310, awards 312, rise to stardom 314, and business ventures 316, as shown in FIG. 3B. In some cases, relationships may be inferred, as shown in the hierarchical structure of FIG. 3B. For example, based on the structure of the table of contents 302, the hierarchical structure of FIG. 3B can be generated, thereby indicating relationships between the different topics.

Figure 4:
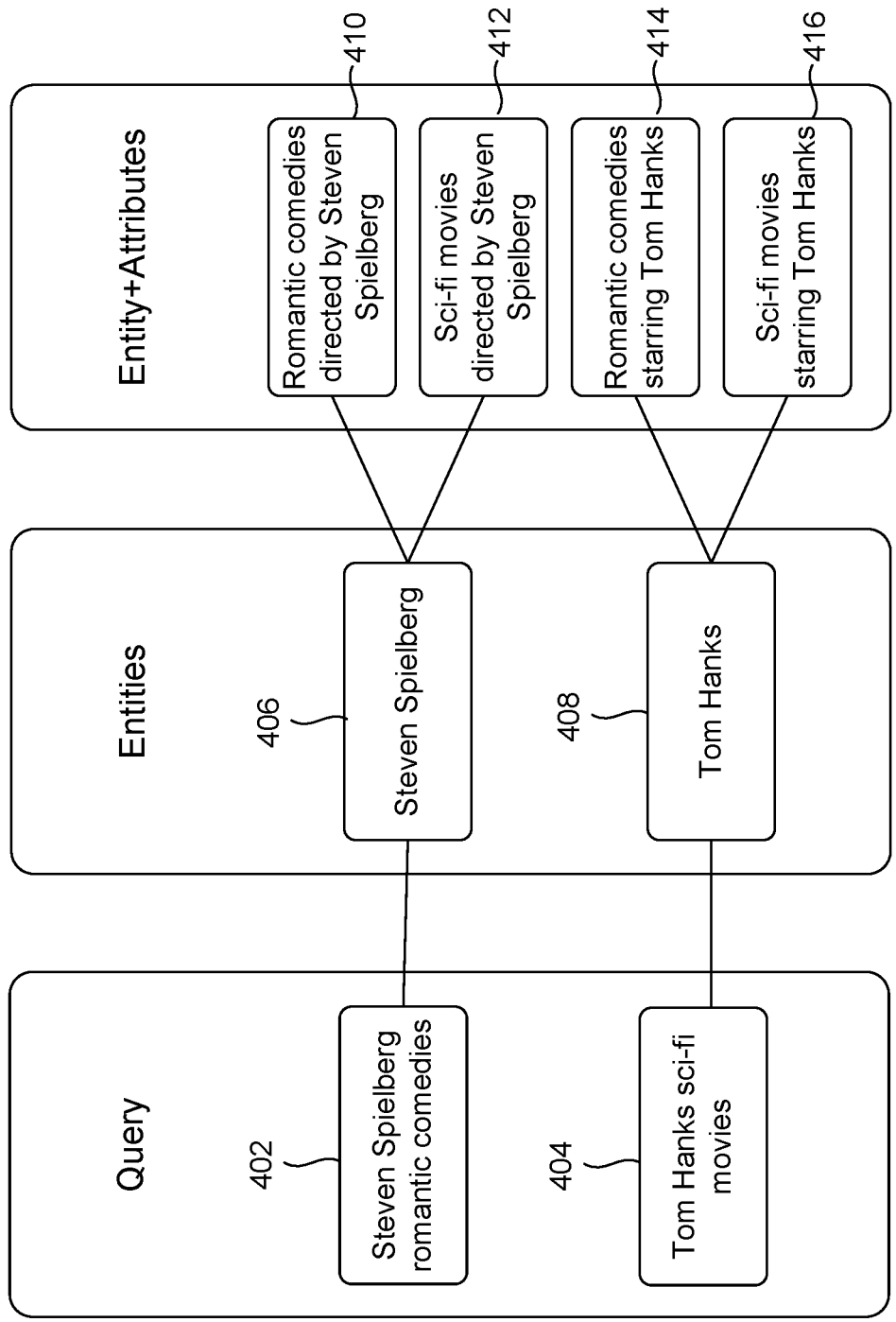
FIG. 4 provides an example of using structured entities to identify topics, in accordance with embodiments of the present technology.

In another example, the topic identifier 224 may use structured entities to identify topics. In this regard, named entity recognition (NER) algorithms may be used to extract entities from queries and/or documents. The topic identifier 224 can then use the extracted entities to identify topics. By way of example only, assume queries "Steven Spielberg romantic comedies" and "Tom Hanks sci-fi movies" exist. In such a case, named entity recognition may be applied to the query to identify the entities of "Tom Hanks" and "Steven Spielberg." In some cases, such identified entities may be used as topics. Alternatively or additionally, entity-attribute combinations can be generated to form topics. Continuing with this example, attributes "romantic comedies" and "sci-fi movies" may be identified. In this example, entity-attribute combinations of "Sci-fi movies directed by Steven Spielberg" and "Romantic comedies starring Tom Hanks" may be generated and used as topics. With reference to FIG. 4, FIG. 4 provides a query 402 and a query 404. From the query 402, and using named entity recognition, entity 406 is identified. From the query 404, and using named entity recognition, entity 406 is identified. The entity 406 can be combined with attributes of the query 402 and query 404 to generate topics 410 and 412. The entity 408 can be combined with attributes of the query 402 and query 404 to generate topics 414 and 416. In some cases, relationships may be inferred, as shown in the structure of FIG. 4.

Figure 5:
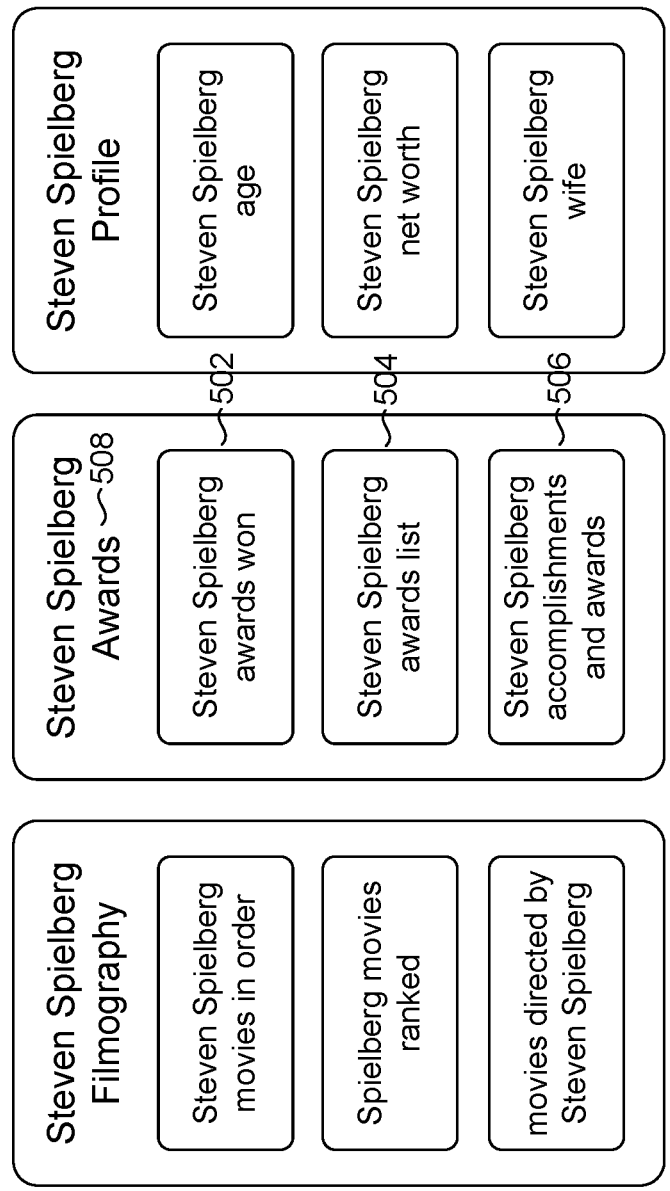
FIG. 5 provides an example of clustering queries to identify topics, in accordance with embodiments of the present technology.

In yet another example, the topic identifier 224 may use search logs to identify topics. As can be appreciated, user search queries are generally logged or captured. Further, in addition to logging search queries, user interactions associated with search queries may be logged. For instance, interactions performed by a user after issuing the search query may be captured (e.g., subsequent queries submitted, links selected, etc.). In some cases, topics can be generated based on search logs. For instance, common queries may be analyzed to identify topics. As another example, common selections following issuance of a search query may be used to identify topics. In some embodiments, similar intent queries may be clustered together and used to identify topics. For instance, upon clustering similar intent queries, the summary of similar intent queries can be generated to identify a topic associated therewith. By way of example only, and with reference to FIG. 5, various queries are illustrated. In this example, query 502, query 504, and query 506 are clustered based on a similar intent. In particular, query 502 includes "steven spielberg awards won, query 504 includes "steven spielberg awards list," and query 506 includes "steven spielberg accomplishments and awards." Based on the clustering, a topic 508 may be identified. In this case, the topic is identified as "Steven Spielberg Awards." As can be appreciated, queries may be clustered using any of a number of techniques. In one example, a clustering technique employed may include a natural language processing technique, such as agglomerative clustering, and leveraging use of large language models to map search queries to vector embeddings.

In yet another example, the topic identifier 224 may use machine learning or large language models (LLMs) to identify topics. In this regard, a LLM may be used to understand user queries and query intent and/or summarize search intent into topics. A LLM generally refers to a language model including a neural network with numerous parameters. LLMs can be trained on large quantities of unlabeled text using self-supervised learning or semi-supervised learning. Examples of LLMs include GPT-3, GPT-4, LaMDA, etc. Machine learning, such as use of LLMs, may also be used to summarize web documents to generate topics.

Using any number of these approaches, among others, the topic identifier 224 may identify any number of topics. In some cases, more recent data may be analyzed to generate more likely relevant topics. Alternatively or additionally, data may be selected for analysis based on other attributes (e.g., particular data sources, particular user data, data associated with a particular demographic, popularity of data, etc.). For instance, topics identified based on user queries may focus on a set of more common or popular queries. Focusing on a reduced size of queries can reduce cost of generating or identifying topics. Data to analyze, such as web documents, query logs, etc. can be referenced or obtained in any number of ways. For example, in some cases, data sources and/or data stores, such as data sources 116 and data store 114 of FIG. 1, may be accessed to analyze such data to generate topics.

The relationship identifier 226 is generally configured to identify relationships between topics (e.g., topics identified via topic identifier 224) and/or extents of relationships therebetween. A relationship generally indicates that topics are linked or associated with one another. A relationship extent generally refers to an extent to which the topics are linked to one another. Relationships among topics and/or extents of relationships can be identified in any number of ways.

In some cases, topic relationships can be determined using information identified via topic mining. For example, in association with the topic identifier 224 identifying topics, such topics may include an indication of relatedness. For example, with regard to topic mining based on analysis of web documents, the web document structure can inherently provide relationship indications. By way of example, and with to FIG. 3B, topics associated with the Amitabh Bachchan web document are linked to each other and to the root topic as such topics are created from the same source. Further, the HTML structure, or contents (e.g., table of contents) indicate a hierarchy in relationships, which may indicate an extent of relatedness. For instance, as shown, the broader topic of "Amitabh Bachchan" 318 includes a set of child topics, including topic 304, 306, 308, 310, and 312. The topic 304 corresponds with subtopics 314 and 316. Such a hierarchy may be determined based on the table of contents 302, the HTML structure, web document meta data, etc. Further, the hierarchy structure may indicate an extent of relatedness. For example, the topic 318 may be identified as more related to topics 304-312 than topics 314 and 316.

As another example, using the structured entities approach to identifying topics can also enable detection or identification of topic relationships. For instance, with reference to FIG. 4, FIG. 4 illustrates an example hierarchy structure of topics, thereby indicating relationships between topics representing a query, topics representing entities, and topics representing entity-attributes and/or relationship extents associated therewith. Further, such topics may be identified as related to other topics (e.g., indicating other entities) based on whether the topics appear together in web documents, search queries, and/or the like. For instance, assume a web document references a first individual, which is identified as a topic, and a second individual, which is identified as another topic. In such a case, the first individual and the second individual may be identified as likely to have a closer topic relationship than two entities picked at random.

Accordingly, in some implementations, the relationship identifier 226 may reference data accessed by or generated by the topic identifier 224 to identify relationships between topics. Alternatively or additionally, the relationship identifier 226 can analyze data to determine relationships among topics and/or corresponding relationship extents. As one example, search logs can be used identify relationships. For example, search logs can be analyzed to perform clustering, classification, and/or identifying common patterns in data, thereby facilitating identification of relationships among topics. For instance, assume a user initiates a query and then moves from one search to another search. The search logs record interactions of the user in association with issuing the initial search query and interactions following the issuance of the initial search query. Using the search logs, topic relationships can be identified, for instance, by grouping similar intent queries to a topic and identifying common patterns or themes in data. In embodiments, a topic identifier that summarizes intent expressed in a cluster is generated.

Figure 6A:
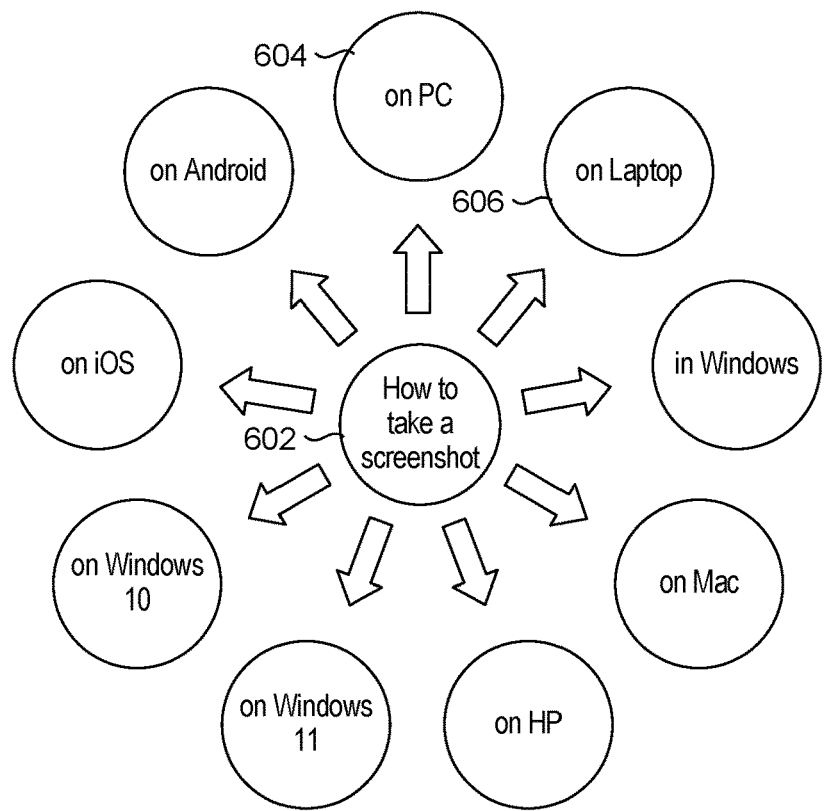
FIGS. 6A and 6B provide an example of using search logs to identify topic relationships, in accordance with embodiments of the present technology.
Figure 6B:
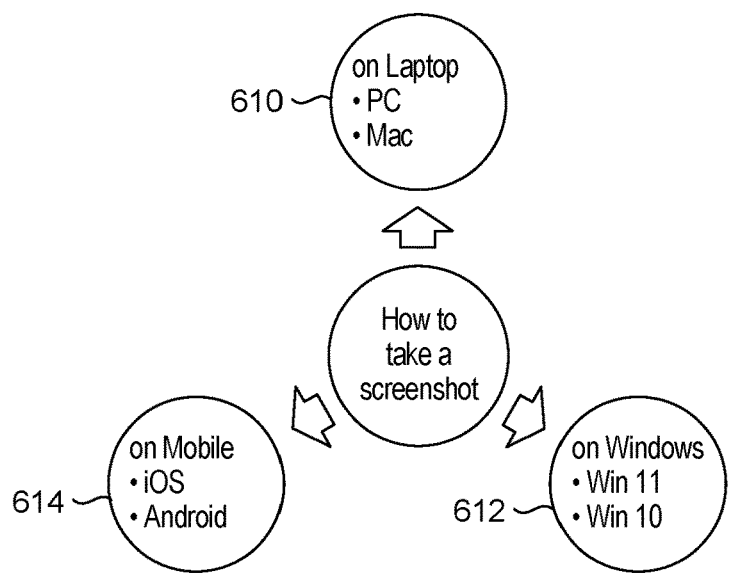

By way of example, and with reference to FIGS. 6A and 6B, assume users reformulate an initial query 602 of "How to take a screenshot" to reference a particular operating system, platform, or device. For instance, subsequent queries may be input, such as "How to take a screenshot on PC," as indicated at 604, "How to take a screenshot on Laptop," as indicated at 606, etc. Such user transitions in search queries can imply a natural demand-side relationship among topics. For example, as illustrated in FIG. 6B, the aspects related to the laptop are clustered together, as shown at 610, the aspects related to Windows® are clustered together, as shown at 612, and the aspect related to mobile are clustered together, as shown at 614. Accordingly, the relationships among topics can be generated based on the search log.

As described, in embodiments, the relationship identifier 226 may also determine an extent of a relationship. An extent of a relationship, or relationship extent, generally indicates a strength or distance of a connection or relatedness between topics. Accordingly, a relationship extent that is greater can indicate a stronger relationship or connection between topics. A relationship extent may be determined in any number of ways, some examples of which are provided herein. As one example, a relationship extent may be based on levels of a hierarchical structure. For example, assume a hierarchical structure is generated in association with a set of topics. In such a case, a relationship extent or weight may be based on a number of levels that separate the topics. As another example, a relationship extent may be based on a similarity of clusters in which topics belong. For instance, a distance or proximity of one cluster having one topic to another cluster having another topic may be used to determine relatedness of the topics.

As can be appreciated, identified topics, relationships, and/or relationship extents associated therewith, can be stored for subsequent use. For example, identified topics, relationships, and/or relationship extents may be stored in a data store, such as data store 214. In some implementations, a type of topic may be identified and stored in association with the topic relationship (e.g., a type of topic, such as general or focused, may be stored in association with a topic relationship associated with a topic-primary topic pair. For example, topics may be identified as a general topic or a focused topic. Indicating a type of topic may be useful to facilitate generation of interactive search exploration tools. For instance, and as described herein, general topics may be represented differently within an interactive search exploration tool than a focused topic.

As described herein, in some embodiments, topics are represented in the form of a query. As such, in some cases, the topics can be converted to a query representation. For instance, assume a topic is identified as "Awards won by Steven Spielberg." In such a case, the topic can be converted, or the set of topic can be supplemented with, a query of "How many awards did Steven Spielberg win." Such topic representation conversions may be performed in advance of an interactive search exploration tool generation such that the topic representations are stored and referenced. In other cases, topic representation conversions may be performed in accordance with generating an interactive search exploration tool for a particular primary topic.

Topics and/or corresponding relationships can be represented in any number of forms. In embodiments, a topic graph may be generated and stored. A topic graph may be in the form of a knowledge graph. A knowledge graph generally includes a graph-structured data model or topology to integrate data. A knowledge graph can be used to store connected concepts of entities and encode semantics, properties, and/or relationships associated therewith. Typically, the edges define the relationship between the nodes (e.g., topics) in the knowledge graph. As such, a topic graph may be generated that includes topics as nodes in the graph with edges indicating relationships between topics and, in some cases, extents of relationships between topics.

In some cases, the topic manager 220, for example, via topic identifier 224 and/or relationship identifier 226 may identify topics and/or relationships in a manner so as to update topics and/or relationships associated therewith. For instance, topics may be added to previously identified topics or replace previously identified topics. As one example, topics may be assigned a "weight" based on popularity and engagement in search. For instance, a popular topic may be assigned a high weight, indicating the topic is currently popular. Topics that are identified as having a low weight (e.g., below a threshold weight), and corresponding relationships, can be removed from the set of topics (e.g., as provided in a topics graph). Such a removal may be performed as a batch process, such as upon lapse of a time period, or in a streaming manner. Topic identification and relationships therebetween can also be performed to add new topics. For example, new topics and/or corresponding relationships may be identified in a streaming manner (e.g., using a streaming graph algorithm).

In addition to managing topics and relationships, the topic manager 220 may also be configured to manage topic meta data, via the meta data identifier 228. Topic meta data may include any data associated with topics. As one example, topic meta data includes a topic content snippet. A topic content snippet refers to a summary or brief description, an image, and/or a video providing a representation of a topic. A topic content snippet can be identified in any of a number of ways. For example, a topic content snippet may include a summary or content associated with a top search result that would result if the topic was input as a search query into a search engine. For instance, assume a topic is an individual. If the name of the individual is input into a search engine, the top result may be analyzed or a search snippet generated for the top result may be used as topic content snippet. As another example, a topic content snippet may include a representation of a set of search results that would result if the topic was input as a search query into a search engine. Other methods may be used to generate a topic content snippet, and embodiments described herein are not intended to be limited. Topic meta data may be stored, for example, in data store 214, in association with the corresponding topic for subsequent reference.

Turning to the related topic manager 222 of the search exploration manager 218, the related topic manager 222 is generally configured to generate and provide interactive search exploration tools. In this regard, in response to an input query, the related topic manager 222 generates a corresponding interactive search exploration tool for providing for display. The interactive search exploration tool enables a user to explore topics related to the input query, or other primary topic, in an efficient and effective manner. As shown in FIG. 2, the related topic manager 222 may include a related topic identifier 230, a tool manager 232, and a tool provider 234. According to embodiments described herein, the related topic identifier 230, the tool manager 232, and the tool provider 234 can include any number of other components not illustrated. In some embodiments, one or more of the illustrated components 230, 232, and 234 can be integrated into a single component or can be divided into a number of different components.

The related topic identifier 230 is generally configured to identify topics related to a primary topic. Generally, the initial primary topic is an input search query. In this way, various topics related to a given input search query are identified. As described herein, the primary topic may change depending on user interaction with the interactive search exploration tool. As previously described, in some cases, interactive search exploration tool generation may be initiated based on identifying or obtaining a primary topic. In this way, the search exploration manager 218 may obtain input data 250. Such input data 250 may include an exploration tool request 252. The exploration tool request 252 may include an indication or a request to generate an interactive search exploration tool. In some examples, the exploration tool request 252 includes or is association with a primary topic. For example, assume a user inputs a search query into a search box. In such a case, the exploration tool request 252 may include an indication of the particular input search query. As another example, assume a user selects a related topic presented in an interactive search exploration tool currently displayed to a user. In such a case, the exploration tool request 252 may include an indication of the selected related topic.

In one embodiment, identifying a topic or set of topics related or relevant to the primary topic uses information retrieval (IR) techniques to identify relevant topics for a primary topic, such as an input query. Information retrieval techniques may include normalization, tokenization, inverted index retrieval, Approximate Nearest Neighbor (ANN) based query expansion, partial match, and/or the like. In accordance with identifying an initial set of topics, the topics can be expanded or supplemented. For example, upon identifying an initial set of topic s, topics related to the initial set of topics can be identified (e.g., using information retrieval techniques).

In some cases, related topics may be identified using a topic graph. In this way, a topic graph, such as a topic graph generated via topic manager 220, can be accessed (e.g., via data store 214) and used to identify topics related to a primary topic. In this regard, in connection with obtaining a search query as a primary topic, the primary topic, or an intent of the primary topic, may be mapped to a node in the topic graph and used to fetch related topics. For example, for a search query, the search query, or an intent determined in association with the search query and its results, can be mapped to a node representing a topic in the topic graph. The topic graph can then be used to identify related topics and corresponding extents of relatedness. For instance, a topic one level away from a node corresponding with a primary topic may be assigned a first extent of relatedness, while a topic two levels away from the node corresponding with the primary topic may be assigned a second extent of relatedness, which is less than the first extent of relatedness. As another example, the relatedness extent may be previously determined and stored in association with a topic such that upon identifying a related topic, the corresponding extent of relatedness can be referenced and used. In some cases, topic graph computations occur offline in a batch mode. In other cases, topic graph computations are identified in a real-time manner.

In some cases, the related topic to include in an interactive search exploration tool may be selected from among a set of candidate related topics. For example, an extensive amount of related topics may be reduced by combining or aggregating the topics or by selecting specific topics (e.g., higher ranked topics). Related topics may be ranked, for instance, based on relatedness to the primary topic. In some cases, a set of most related topics may be selected. In other cases, related topics associated with varying levels of relatedness may be selected (e.g., to diversify the related topics presented to the user). Other implementations are also contemplated and the examples provided herein are not intended to be limiting.

In accordance with identifying a set of related topics to include in an interactive search exploration tool, topic meta data may also be referenced or identified. For instance, topic content snippets associated with the set of related topics may be identified. In some cases, such identification of topic meta data (e.g., topic content snippets) may be identified or referenced upon interaction with a topic presented in the interactive search exploration tool. For instance, upon a user selecting or hovering over a related topic presenting in an interactive search exploration tool, a topic content snippet associated with the related topic may be identified (e.g., via a data store) and provided for presentation in association with the interactive search exploration tool. In embodiments, topic meta data (e.g., topic content snippets providing content to show as a representation of a topic) may be computed in batch mode and stored in distributed data stores.

The tool manager 232 is generally configured to manage interactive search exploration tools. In this regard, the tool manager 232 can generate interactive search exploration tools and update such tools based on interaction associated therewith. To generate an interactive search exploration tool, related topics relevant to a primary topic and an extent of relatedness to the primary topic are identified. As described, in some cases, related topics may include general topics that are visually represented in one manner and focused topics that are visually represented in another manner. The general topic may be represented using one icon or representation (e.g., a node) indicating a general topic that represents various more focused topics. The focused topics may be represented using another icon or representation indicating a focused topic.

The interactive search exploration tool is generally generated in a manner that presents the related topics with a distance from the primary topic that represents extent of relatedness to the primary topic. For example, topics more related or relevant to a primary topic are positioned closer to the primary topic than topics less related or relevant to the primary topic. As such, a user can efficiently and effectively view topics related to the primary topic and visually recognize the extent of relatedness to the primary topic.

In one implementation, the interactive search exploration tool provides the primary topic in the center of the tool. The interactive search exploration tool can include distance indicators around the primary topic. Distance indicators generally provide an indication of an extent or distance of relatedness to a primary topic. In some cases, distance indicators are represented using concentric shapes, such as rings or circles, positioned around the primary topic. Based on the extent of relatedness to the primary topic, the related topics can be positioned accordingly among the distance indicators. Although concentric rings are provided as one example to indicate distance, embodiments are not intended to be limited hereto. Any shape or form of distance indicators may be included in various implementations.

The tool manager 232 may also update interactive search exploration tools based on interactions associated therewith. As described, a user can interact with an interactive search exploration tool to explore topics and surface new topics. For instance, a user may select a related topic, for example, in the form of a general topic or a focused topic, presented within an interactive search exploration tool. In some cases, selection of a related topic provides more information associated with the related topic (e.g., a search result or information associated with a search result that would result based on the related topic, such as a topic content snippet). Alternatively or additionally, selection of a related topic can transition the related topic to being the primary topic. For example, the related topic may be relocated to the center of the search exploration tool and be the focal point of the exploration. Based on the related topic transitioning to the primary topic, topics related to the new primary topic are identified. As can be appreciated, in some cases, some of the topics already included may also be related to the new primary topic. However, some topics may be removed and/or others may be added as related to the new primary topic. For instance, in some cases, based on a new primary topic, the primary topic may be remapped to the topics such that the related topics are rearranged based on extent of relatedness to the new primary topic and new related topics are added. Further, selection of a related topic may result in the related topic being an input into a search query input box to effectuate a search using the related topic. Such interactions can be selectively implemented or implemented in combination.

As can be appreciated, different types of interactions can initiate different types of events in association with a related topic. For instance, a right click or hover over a related topic may result in more information being presented, a left click over a related topic may result in transitioning the related topic to a primary topic, and selection of an icon (e.g., a search icon) in association with a related topic may result in the related topic being an input into a search query box to effectuate a search using the related topics. Various interactions with search exploration tool are contemplated and are not intended to be limiting herein.

In some cases, an interactive search exploration tool may include a topic sequence indicator. A topic sequence indicator refers to an indication of a sequence of topics. In one example, the topic sequence indicator can provide a visual indication of a sequence of primary topics. For example, a first topic represented in a sequence may be an initial search query. Assume a user selects a topic included in the interactive search exploration tool. In such a case, the topic sequence indicator provides the sequence as the initial search query followed by the selected topic, and so on. Such a visual representation of a sequence of topics enables the user to efficiently view the search exploration by the user. As such, the user may be able to avoid search exploration in a direction previously attempted.

The interactive search exploration tool may include a zoom feature. In this regard, a user may select to zoom into a particular portion of the interactive search exploration tool. In this way, when a user selects to zoom in, more topics related to the zoomed in area may be surfaced.

The tool provider 234 is generally configured to provide interactive search exploration tools. In this regard, upon generating an interactive search exploration tool, the tool provider 234 can provide such a tool, or data associated therewith, for display, for example via a user device. To this end, in cases in which the tool provider 234 is remote from the user device, the tool provider 234 may provide the tool to a user device for display to a user that initiated a search or a request for an interactive search exploration tool.

The tool provider 224 may provide interactive search exploration tools in any number of ways. Further, the particular implementation used for the interactive search exploration tool implemented may be configured in any number of ways. In some cases, an interactive search exploration tool is provided in association with a set of search results for a search. In this way, based on initiating of a search in association with a search query, an interactive search exploration tool corresponding with the search query is provided. The interactive search exploration tool may be presented concurrently with one or more search results. In other cases, an interactive search exploration tool may be provided based on a specific request from a user. For instance, a user may select a search exploratory tool indicator (e.g., presented in a search results page) and, in response, an interactive search exploratory tool is provided for presentation (e.g., via a display screen of the user device).

As such, the interactive search exploratory tool 230 can be provided as output from the search exploration manager 218. As described, the interactive search exploratory tool 230 may be provided for display via a user device. Alternatively or additionally, the interactive search exploratory tool 230 can be provided to the data store 214 and/or other service or system.

Exemplary Implementations for Providing Interactive Search Exploratory Tools

Figure 7:
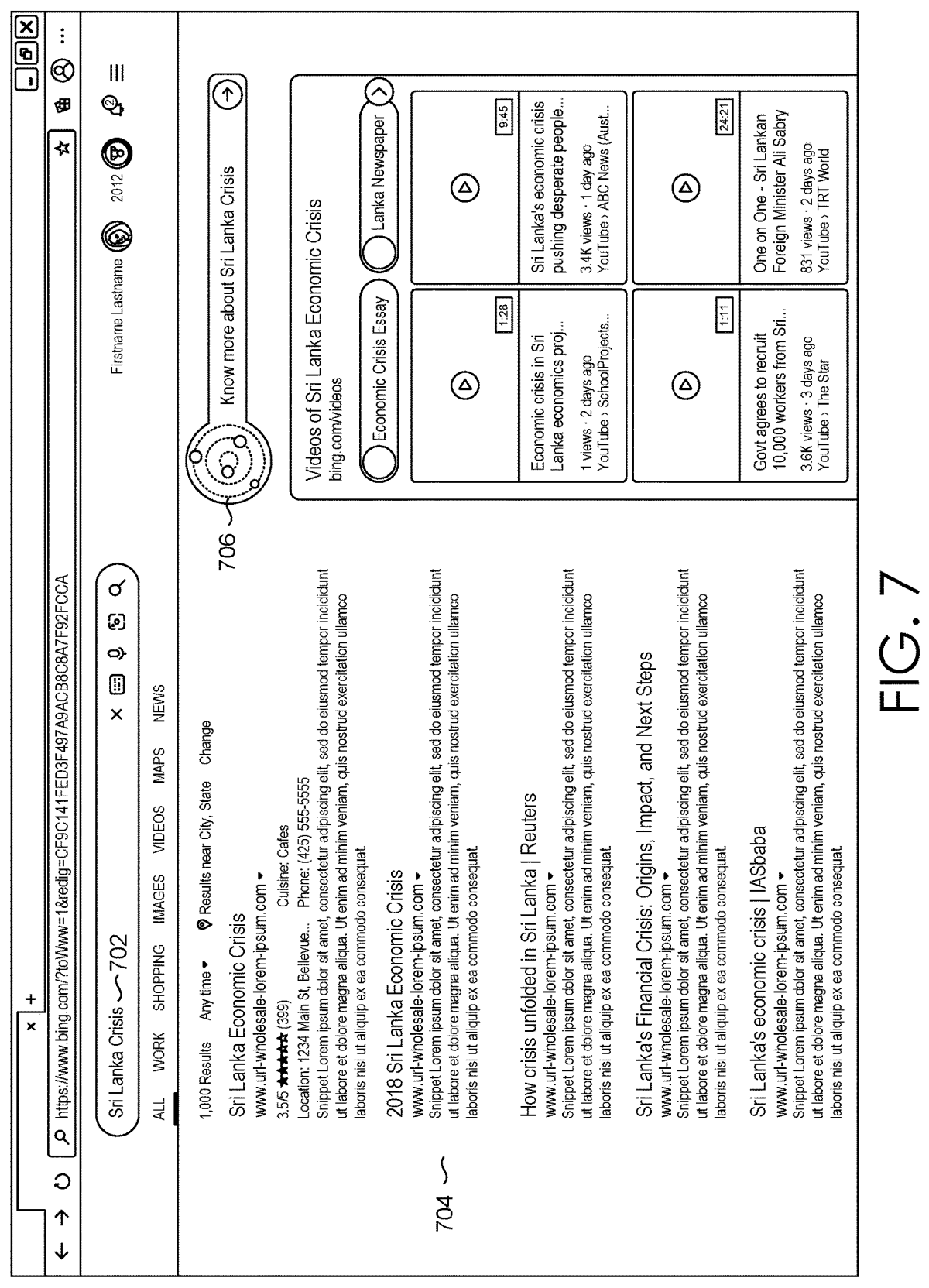

FIGS. 7-10 provide example graphical user interfaces that illustrate various aspects of embodiments described herein. As shown in FIG. 7, FIG. 7 provides an example search results page. As shown, a user inputs a query 702 and, in response a set of search results 704 related to the query are presented. In accordance with embodiments described herein, a search exploratory tool indicator 706 is presented along with the search results 704. Although this implementation provides a search exploratory tool indicator being presented along with search results, in some cases, the interactive search exploratory tool itself may be presented along with search results in response to a search query.

Figure 8:
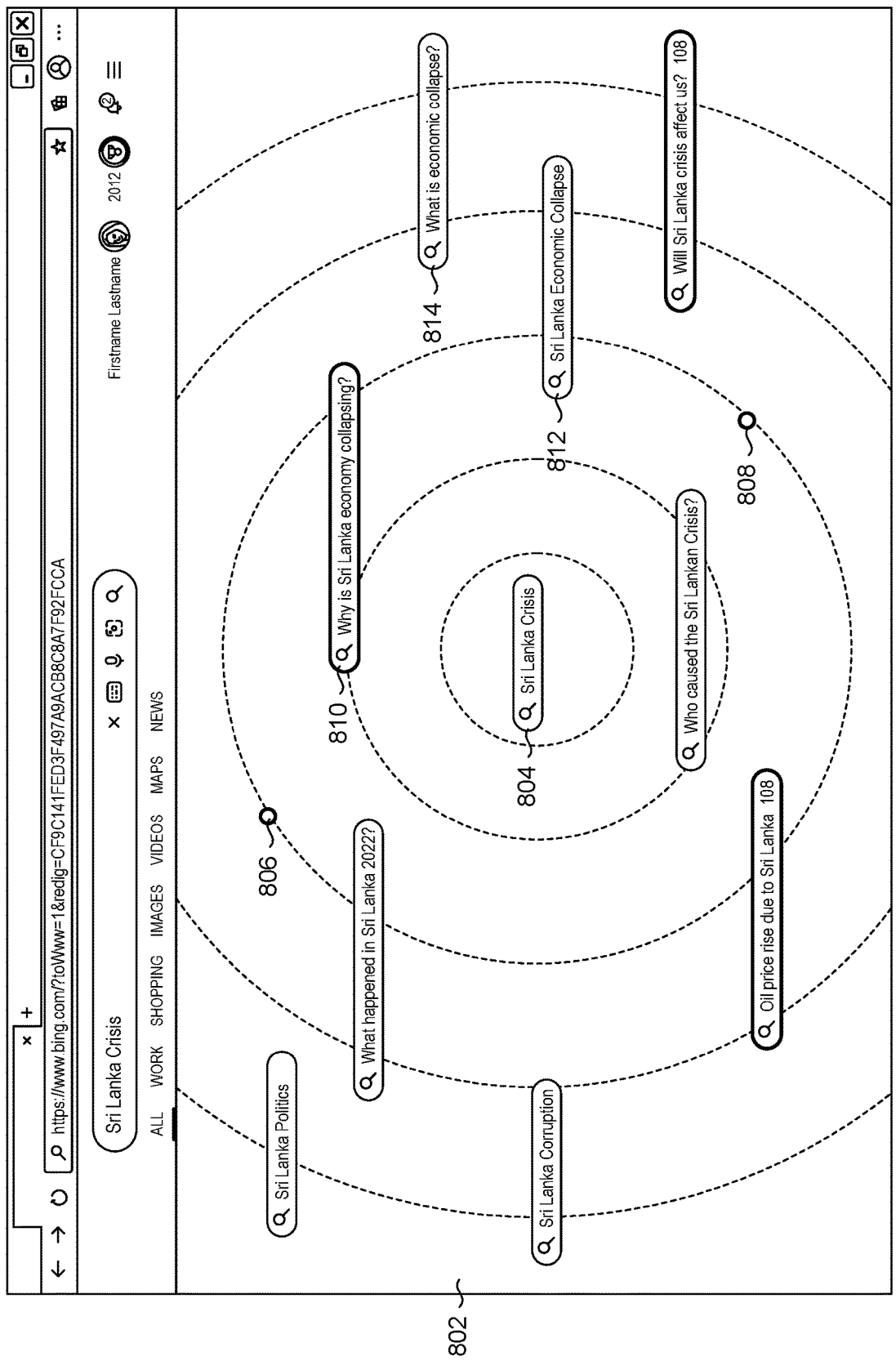
FIG. 8 provides an example interactive search exploratory tool, in accordance with aspects of the technology described herein.
Figure 9:
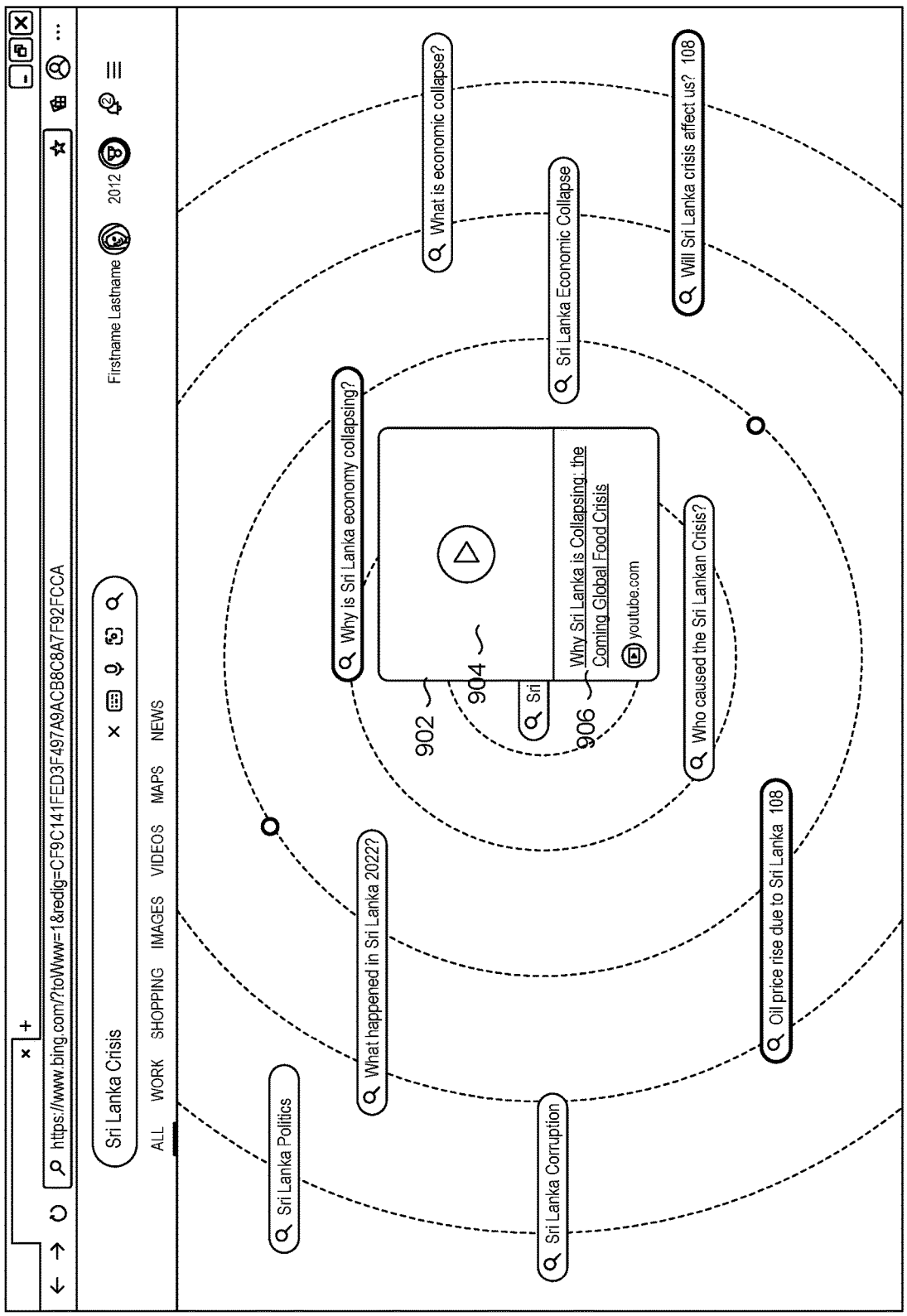
FIG. 9 provides an example topic content snippet, in accordance with aspects of the technology described herein.

Assume a user wishes to explore various topics related to the input search query 702. In such a case, the user can select the search exploratory tool indicator 707 and, in response, be presented with the interactive search exploratory tool 802, as illustrated in FIG. 8. In this example, the user interface transitions to the interactive search exploratory tool. In another example, the interactive search exploratory tool may be presented in a new window. In yet another example, the interactive search exploratory tool may be presented along with the search results (e.g., incorporated into the search results page).

As shown in FIG. 8, the interactive search exploratory tool 802 provides the search query 702 of FIG. 7 as the primary topic 804. In this example, the primary topic 804 is presented with various related topics presented surrounding the primary topic 804. In this example, general topics are represented via nodes 806 and 808. In this example, the general topics do not initially include text indicating the general topics. In embodiments, the topic nodes can be spherical interactive dots that help pivot towards specific related topics that are not queries. Such general topics may reveal high-level information that add a different layer or level of exploration. Examples of general topics may be "recession," "currencies," and "economy." In some cases, a general topic is positioned in proximity to focused topics that correspond with the general topic.

A user may select or hover over the general topics, for example represented as node 806 and node 808, to view a text description of the general topic or a topic content snippet. In some cases, a user may select a general topic to refocus or shift the general topic to be a new primary topic.

In this example, focused topics, that is more specific topics, are represented via text boxes. Focused topics are represented via text boxes 810, 812, and 814. In this example, the focused topics include text indicating the focused topics. A user may select or hover over the focused topics to view a more detailed description of the focused topic or a topic content snippet. Additionally or alternatively, a user may select a focused topic to refocus or shirt the general topic to be a new primary topic.

As can be appreciated, the distance of the related topics, such as general topics 806 and 808 and focused topics 810, 812, and 814, from the primary topic 804 is based on the extent of relatedness to the primary topic 804. The closer a related topic is positioned to the primary topic 804, the stronger the related topic is to the primary topic 804. On the other hand, the further away a related topic is positioned to the primary topic 804, the weaker the related topic is to the primary topic 804.

Assume a user viewing the interactive search exploratory tool 802 is interested in learning more about focused topic 810, representing "Why is Sri Lanka economy collapsing?" In such a case, the user may select (e.g., hover over or right click) the focused topic 810. As a result, a topic content snippet can be displayed. As an example, and with reference to FIG. 9, a topic content snippet 902 may be presented. In this example, the topic content snippet 902 includes a video portion 904 and a link 906. As can be appreciated, any type of content and any amount of content may be presented in a topic content snippet. For example, an image, a video, text, and/or a link may be included a topic content snippet.

Figure 10:
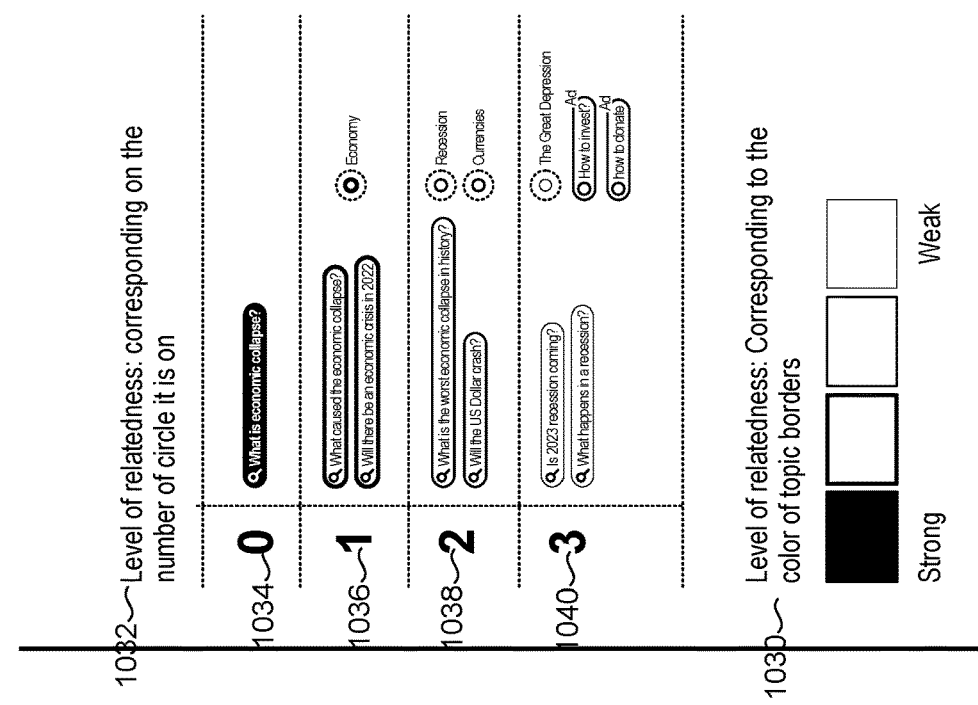
FIG. 10 provides an illustration of arranging related topics relative to the primary topic, in accordance with aspects of the technology described herein.
Figure 10:
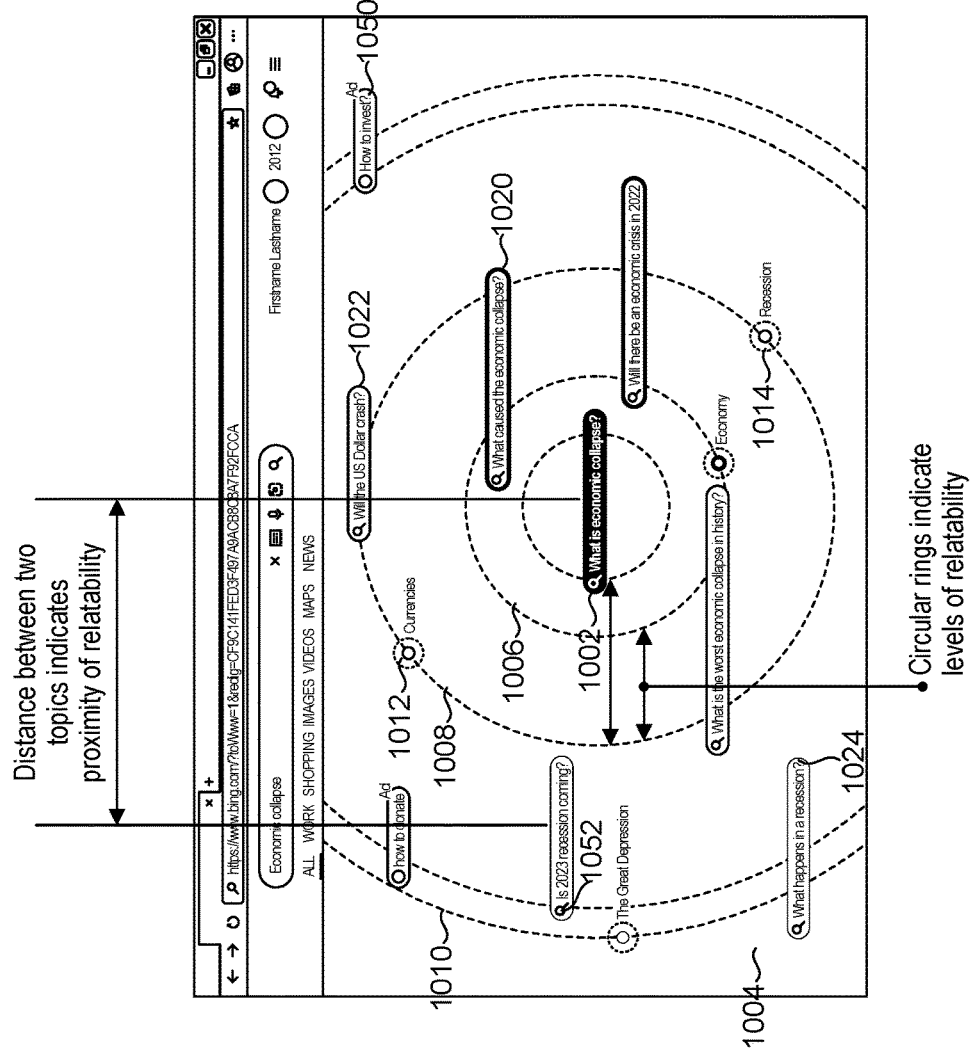

FIG. 10 provides an illustration of arranging related topics relative to the primary topic 1002. In this example, the primary topic 1002 is arranged in the center of an interactive search exploration tool 1004. The closer a related topic is positioned to the primary topic 1002, the more related it is to the primary topic 1002. As described herein, distance indicators visually indicate distance, or extents/levels, of relatability to the primary topic 1002. Examples of distance indicators include circular rings 1006, 1008, and 1010. Circular ring 1006 is closer to the primary topic 1002 and, as such, related topics more aligned with circular ring 1006 are more related to the primary topic 1002 than related topics aligned with circular rings 1008 and 1010.

As shown, both general topics and focused topics can be presented relative to the primary topic 1002 to illustrate relatedness to the primary topic. Examples of general topics in FIG. 10 include general topic 1012 and 1014. Examples of focused topics include focused topic 1020, focused topic 1022, and focused topic 1024. As shown, the focused topic 1020 corresponds with circular ring 1006 and thereby indicates a stronger relatedness to the primary topic 1002 than the focused topics 1022, and 1024. Focused topic 1022 corresponds with circular ring 1008 and, as such, has a stronger relatedness to the primary topic 1002 than the focused topic 1024. Focused topic 1024 corresponds with circular ring 1010. As circular ring 1010 is the most outer ring, the focused topic 1024 is not as strongly related to the primary topic 1002 as other related topics. Advantageously, the distance indicators, in this case the circular rings, provide a visual indication of relatedness in an efficient and effective manner.

In some cases, additional or alternative visual indicators can be provided to indicate strength of relatedness to a primary topic 1002. For example, in this example, the thickness of the border of the related topic indicates strength of relatedness. As shown, the borders of focused topics 1020 and 1026, corresponding with circular ring 1006, are thicker and more visually apparent than the borders of other focused topics. As the related topics are positioned further from the primary topic 1002, the borders become thinner or more visually faint. Other visual indicators can be used, such as, for example, colors, depth of colors, etc.

As illustrated in FIG. 10, in some embodiments, an interactive search exploration tool may include or be associated with a relatedness key and/or a relatedness summary. A relatedness key generally provides an indication of visual aspects included in the interactive search exploration tool. In this example, the relatedness key 1030 includes indications of the different border widths of the topics. Although this example includes border widths, any other visualization may be included to distinguish between different levels of relatedness of topics to the primary topic. The relatedness summary 1032 includes a summary of the different levels of relatedness of topics to the primary topic 1002. In this example, the primary topic is provided at level 0 1034. At a first level 1036, related topics, including focused topics and a general topic, that correspond with circular ring 1006 are provided. At a second level 1038, related topics that correspond with circular ring 1008 are provided. At a third level 1040, related topics that correspond with circular ring 1038 are provided. As shown, in addition to including various general and focused topics in association with distance indicators and/or in the relatedness summary 1032, advertisements related to the primary topic 1002 may also be presented. In this way, a topic may be in the form of an advertisement. For example, a related topic 1050 is shown in the form of an advertisement. Determining relatedness may be performed in a manner similar to determining relatedness for other general topics and/or focused topics. To the extent the user is interested in a related topic to execute a search, the search icon associated with the topic can be selected. For example, search icon 1052 may be selected to execute a search related to "Is 2023 recession coming?" In this case, the topic may be input as a search query to the search engine to execute a search and present the relevant search results in a search results page, such as shown in FIG. 7.

Figure 11:
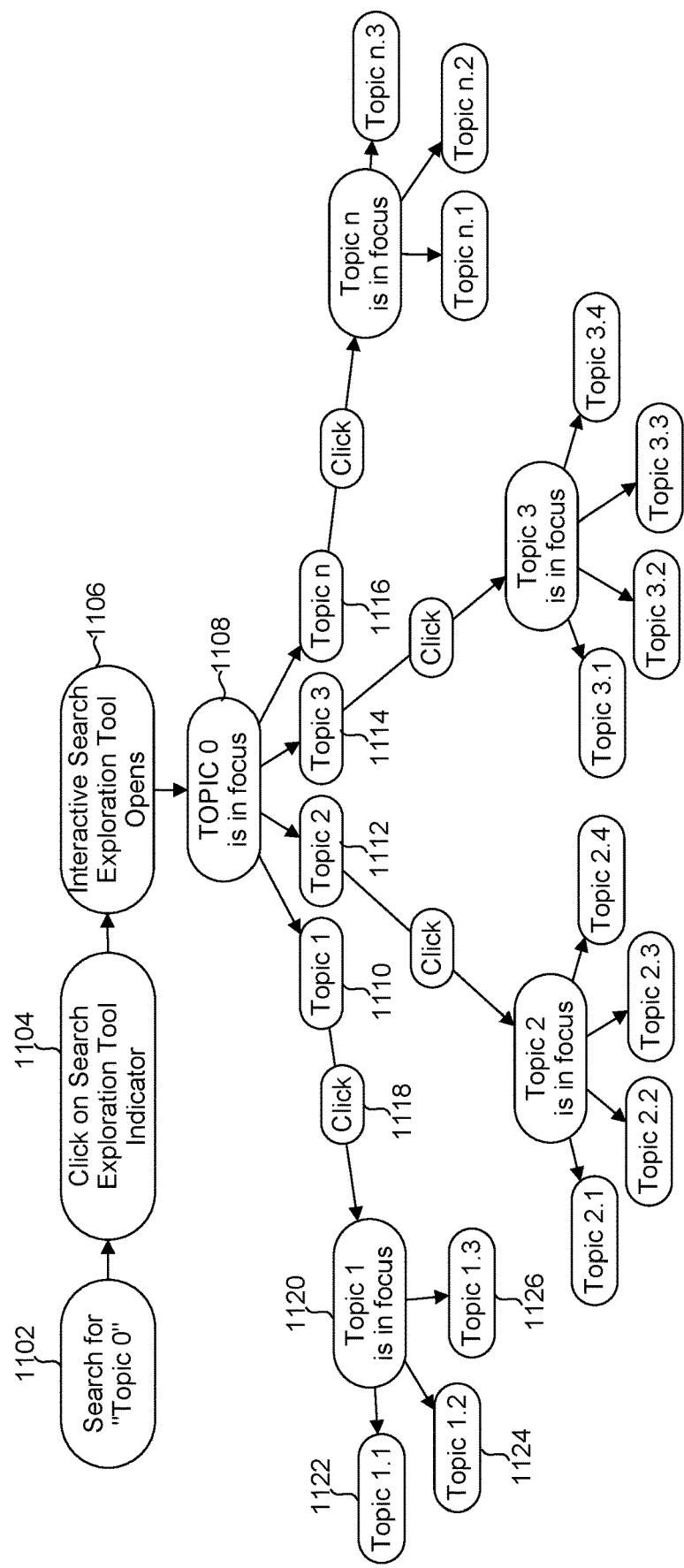
FIG. 11 provides one example of a workflow illustrating refocusing topics based on user interactions with topics presented via an interactive search exploration tool, in accordance with aspects of the technology described herein.

Turning to FIG. 11, FIG. 11 provides one example of a workflow illustrating refocusing topics based on user interactions with topics presented via an interactive search exploration tool. In this example, a user inputs a search query to search for "Topic 0," as indicated at block 1102. In accordance with providing the search query, a search exploration tool indicator is presented. Assume the user selects on the tool, as shown at block 1104. In such a case, an interactive search exploration tool is presented, as shown at block 1106. The search results page may transition to the interactive search exploration tool in one implementation. In another implementation, the interactive search exploration tool may be provided in a new window or within the search results page. In the presented interactive search exploration tool, the search query "Topic 0" is the primary topic illustrated, as indicated at 1108.

Assume that related topics 1110, 1112, 1114, and 1116 are visually represented in the interactive search exploration tool. For example, as described herein, the related topics 1110, 1112, 1114, and 1116 can be arranged around the primary topic 1108 in proximity relative to the relatedness of the topic to the primary topic 1108. Now assume a user selects 1118 related topic 1110 as a topic of interest (e.g., left clicks on related topic 1110). In such a case, the interactive search exploration tool is adjusted or updated to refocus on the selected related topic 1110. As such, the related topic 1110 becomes the primary topic and is moved to the center of the interactive search exploration tool. Further, topics related to the Topic 1 1110 are identified and presented within the interactive search exploration tool in a manner that positions the new related topics around Topic 1 1110 based on relatedness to the new primary topic, Topic 1 1110. In this example, new topics 1122, 1124, and 1126 are identified and positioned around Topic 1 now in focus. This process may continue in an iterative manner as new related topics are selected for refocusing, enabling a user to explore various topics.

Figure 12:
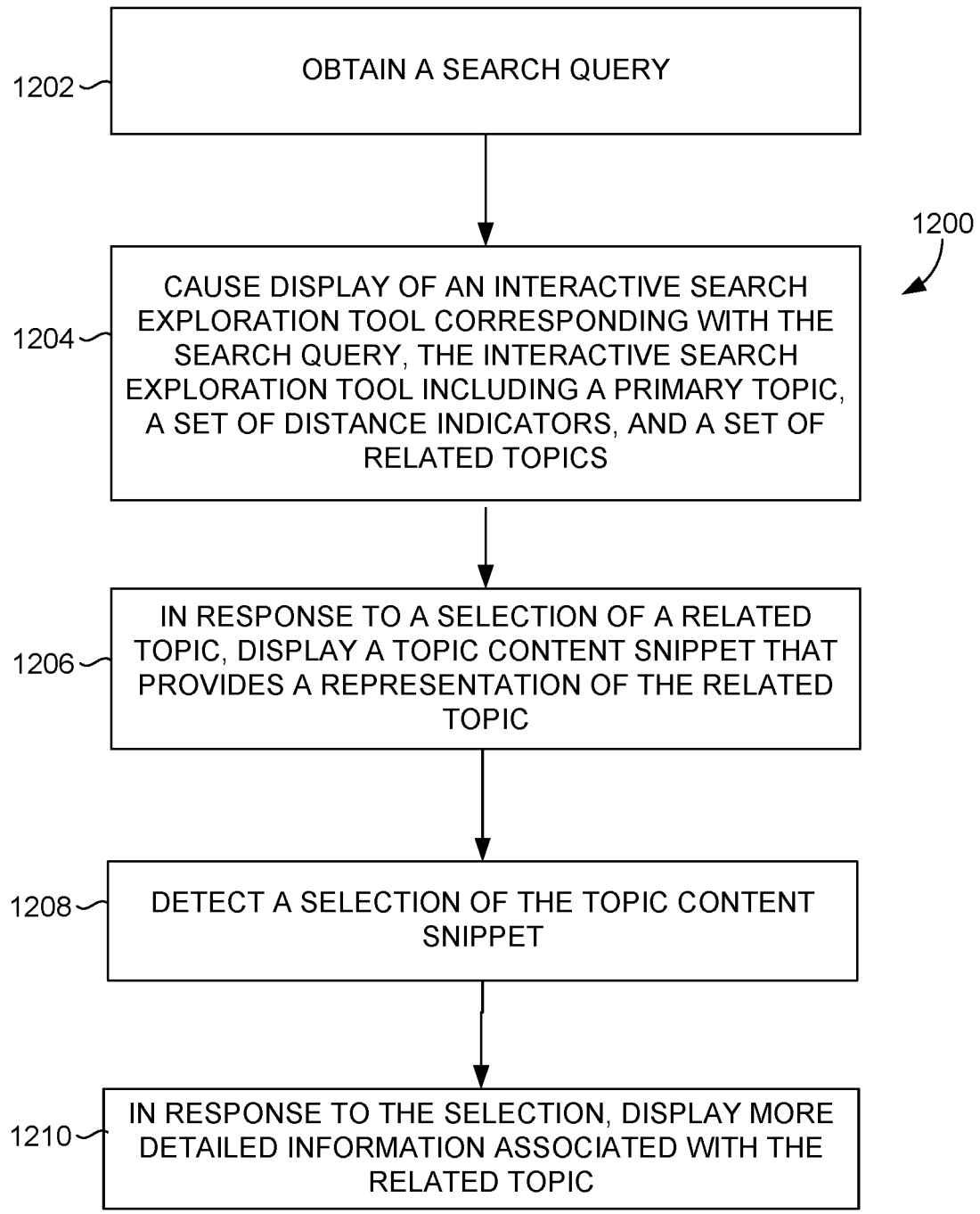
FIG. 12 provides one method directed to facilitating providing interactive search exploration tools, in accordance with aspects of the technology described herein.
Figure 13:
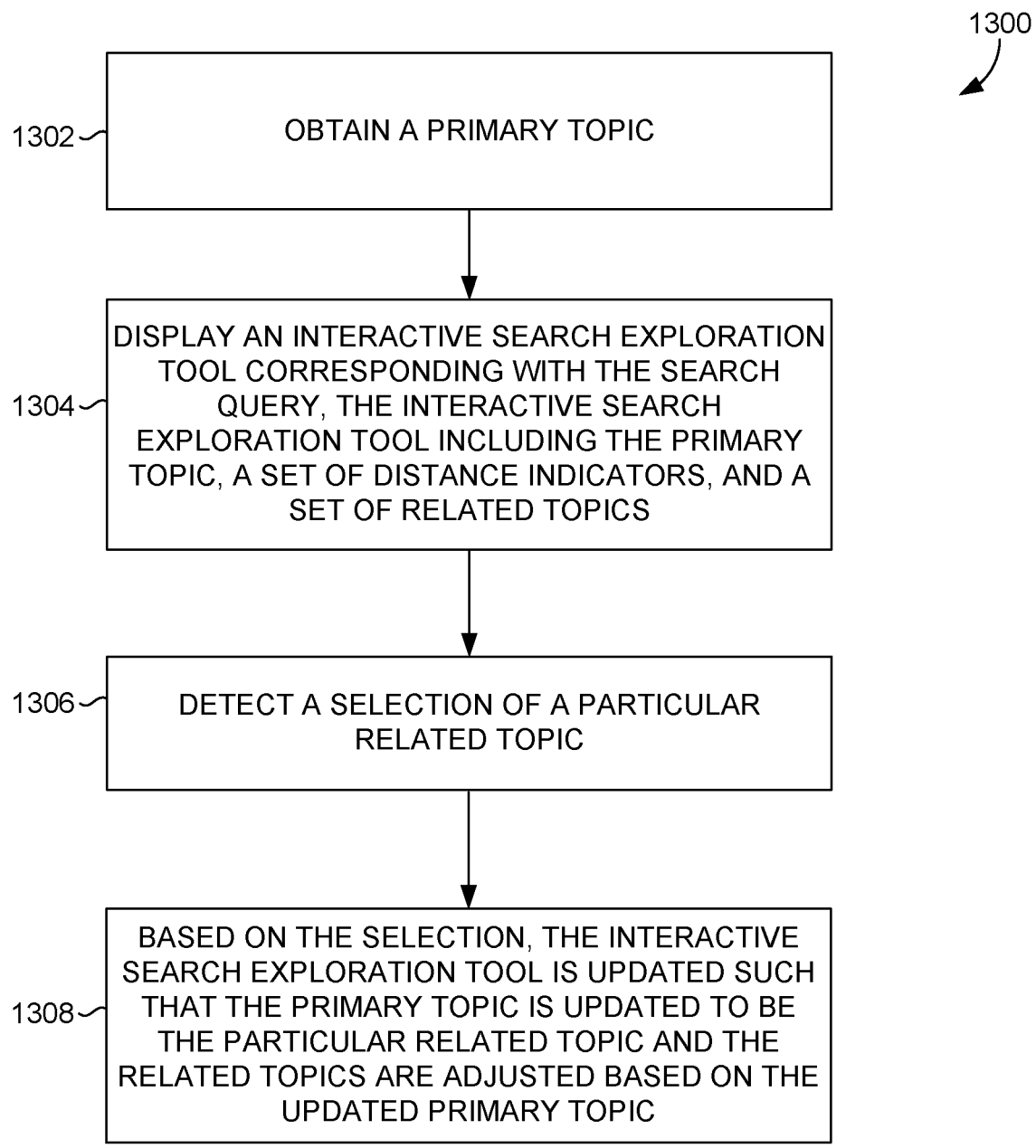
FIG. 13 provides another method directed to facilitating providing interactive search exploration tools, in accordance with aspects of the technology described herein.
Figure 14:
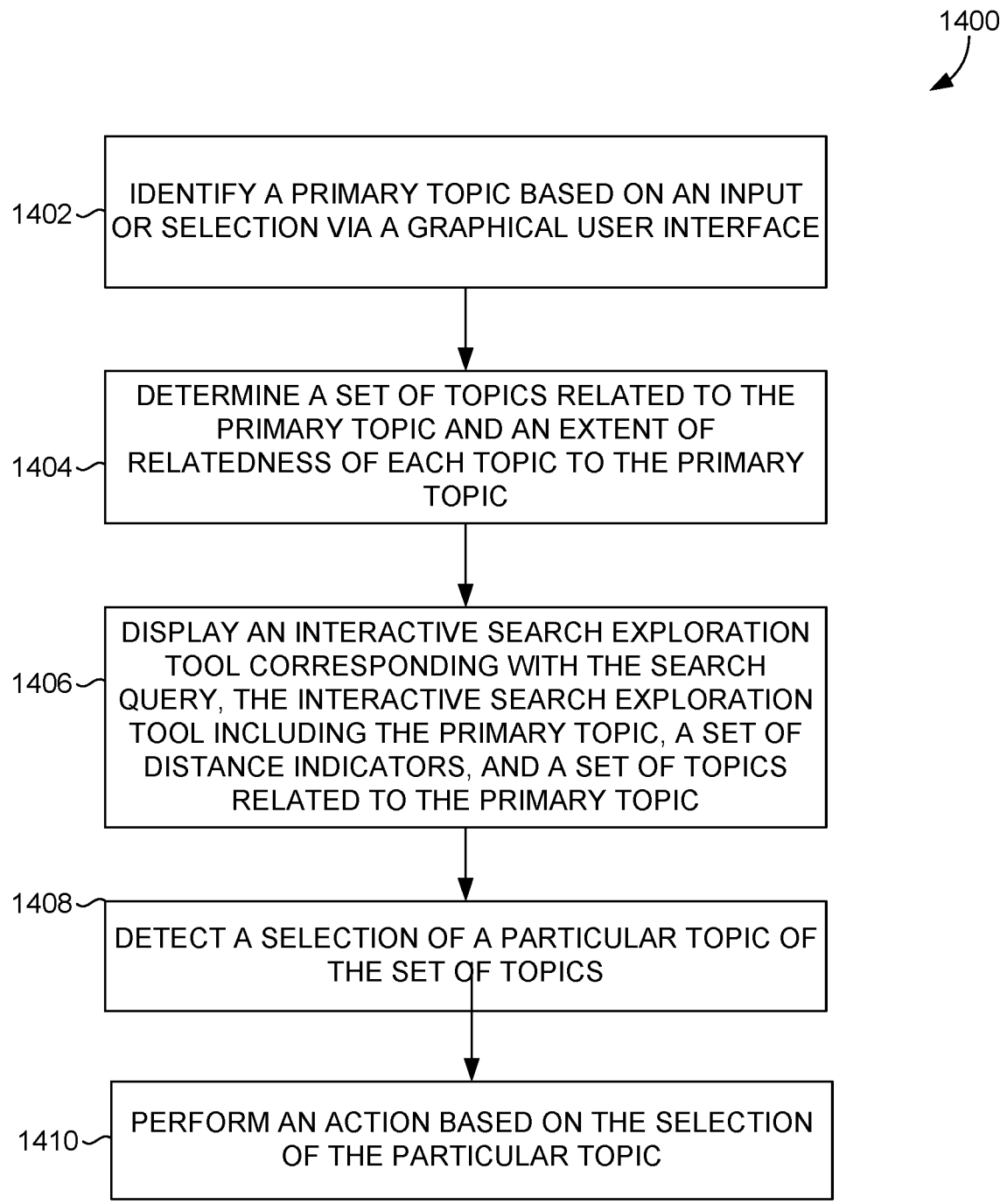
FIG. 14 provides yet another method directed to facilitating providing interactive search exploration tools, in accordance with aspects of the technology described herein.

As described, various implementations can be used in accordance with embodiments described herein. FIGS. 12-14 provide methods of facilitating providing interactive search exploration tools, in accordance with embodiments described herein. The methods 1200, 1300, and 1400 can be performed by a computer device, such as device 1500 described below. The flow diagrams represented in FIGS. 12-14 are intended to be exemplary in nature and not limiting.

Turning initially to method 1200 of FIG. 12, method 1200 is directed to facilitating providing interactive search exploration tools, in accordance with embodiments of the present technology. Initially, at block 1202, a search query is obtained. At block 1204, an interactive search exploration tool corresponding with the search query is caused to be displayed. In some cases, the interactive search exploration tool may be displayed based on a selection of a search exploration tool indicator presented in association with a set of search results displayed in response to execution of the search query. In one embodiment, the interactive search exploration tool includes a primary topic, indicating the search query, that is positioned at a center of the interactive search exploration tool. A set of distance indicators indicating extents of relatedness to the primary topic are positioned around the primary topic. The set of distance indicators may be represented as concentric shapes, with each shape of the concentric shapes indicating a different extent of relatedness to the primary topic. In some cases, the concentric shapes may be circular rings. Further, the interactive search exploration tool includes a related topic(s), identified as related to the primary topic, positioned around the primary topic. As can be appreciated, the related topic is positioned in proximity to a distance indicator that corresponds with an extent of relatedness of the related topic to the primary topic. The related topics may be in the form of general topics (e.g., represented as a node) and/or focused topics (e.g., represented as a text query). In some cases, the related topics may be presented with a visual indication of the extent of relatedness of the related topic to the primary topic. For example, the thickness or shade of the border may indicate an extent of relatedness. The related topics may additionally or alternatively include a search icon that, if selected, initiates execution of a search of the related topic. As can be appreciated, related topics may be identified as related or relevant to a primary topic in any number of ways. For example, topics may be identified as related based on analysis of a search query log or a set of web documents.

Thereafter, at block 1206, in response to a selection of the related topic via the graphical user interface, display of a topic content snippet that provides a representation of the related topic is caused. In one embodiment, the topic content snippet comprises text, an image, and/or a video that represents at least one search result corresponding with the related topic. At block 1208, a selection of the topic content snippet, or a portion thereof, is detected. In response to the selection, as indicated at block 1210, display of more detailed information associated with the related topic is caused.

Turning now to FIG. 13, method 1300 is directed to providing interactive search exploration tools, in accordance with embodiments of the present technology. Initially, at block 1302, a primary topic is obtained. For example, a search query may be input by a user via a search interface. At block 1304, display, via a graphical user interface, of an interactive search exploration tool corresponding with the search query is caused. The interactive search exploration tool may include the primary topic, indicating the search query, that is positioned at a center of the interactive search exploration tool. The interactive search exploration tool may also include a set of distance indicators indicating extents of relatedness to the primary topic. The set of distance indicators can be represented as concentric shapes positioned around the primary topic, with each shape of the concentric shapes indicating a different extent of relatedness to the primary topic. Further, the interactive search exploration tool may include a set of related topics, identified as related to the primary topic, positioned around the primary topic. Each related topic of the set of related topics can be positioned in proximity to a distance indicator that corresponds with an extent of relatedness of the associated related topic to the primary topic. The related topics may be general topics represented by nodes and/or focused topics represented by text queries, for example. Further, related topics may include a visual indication (e.g., border thickness or a depth of color) of the extent of relatedness of the related topic to the primary topic.

Thereafter, at block 1306, a selection of a particular related topic is detected. At block 1308, based on the selection, the interactive search exploration tool is updated such that the primary topic is updated to be the particular related topic and the related topics are adjusted based on the updated primary topic. For example, a new topic may be identified as related to the new primary topic and added to the interactive search exploration tool. Further, related topics may be repositioned around the new primary topic based on relatedness to the new primary topic. As can be appreciated, the updated interactive search exploration tool can be interacted with to further explore topics. For example, a related topic may be selected to view a topic content snippet that provides a representation of the related topic (e.g., relevant text, image, and/or video associated with the related topic).

With reference now to FIG. 14, method 1400 is directed to facilitating provision of interactive search exploration tools, in accordance with embodiments of the present technology. Initially, at block 1402, a primary topic is identified based on an input or selection via a graphical user interface. As one example, a primary topic may be identified based on a search query input by a user. As another example, a primary topic may be identified based on a user selection of a topic presented via a displayed interactive search exploration tool.

At block 1404, a set of topics related to the primary topic and an extent of relatedness of each topic to the primary topic is determined. Such a determination may be performed in any number of ways. As one example, such a determination(s) may be based on analysis of web documents, a search query log, or a combination thereof. For instance, the set of topics related to the primary topic and the extent of relatedness of each topic to the primary topic may be determined using a topic graph generated based on the analysis of web documents, the search query log, or a combination thereof.

At block 1406, display of an interactive search exploration tool corresponding with the primary topic is caused. In some implementations, display of the interactive search exploration tool may be based on a selection of a search exploration tool indicator presented in association with a set of search results displayed in response to execution of the search query.

In embodiments, the interactive search exploration tool includes the primary topic positioned at a center of the interactive search exploration tool. The interactive search exploration tool may also include a set of distance indicators indicating a relatedness distance to the primary topic. The set of distance indicators may be represented as concentric shapes positioned around the primary topic, for example, with each shape of the concentric shapes indicating a different relatedness distance to the primary topic. The interactive search exploration tool may also include the set of topics related to the primary topic positioned around the primary topic. Each topic may be positioned in proximity to a distance indicator that corresponds with the extent of relatedness of the topic to the primary topic.

At block 1408, a selection of a particular topic of the set of topics is detected. Thereafter, at block 1410, an action is performed based on the selection of the particular topic. In this regard, and in some cases depending on a type of selection, initiation of display of a topic content snippet that provides a representation of the particular topic may be caused, execution of a search of the particular topic may be performed, and/or generation of an updated interactive search exploration tool that updates the primary topic to be the particular topic may be performed.

Accordingly, we have described various aspects of technology directed to systems, methods, and graphical user interfaces for intelligently determining and providing interactive search exploration tools. It is understood that various features, sub-combinations, and modifications of the embodiments described herein are of utility and may be employed in other embodiments without reference to other features or sub-combinations. Moreover, the order and sequences of steps shown in the example methods 1200, 1300, and 1400 are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a computer-implemented method for presenting an interactive search exploration tool in a graphical user interface that is operating on a computer system is provided. The method includes obtaining a search query. The method further includes causing display, via the graphical user interface, of the interactive search exploration tool corresponding with the search query. The interactive search exploration tool includes a primary topic, indicating the search query, that is positioned at a center of the interactive search exploration tool. The interactive search exploration tool also includes a set of distance indicators indicating extents of relatedness to the primary topic, the set of distance indicators represented as concentric shapes positioned around the primary topic, with each shape of the concentric shapes indicating a different extent of relatedness to the primary topic. The interactive search exploration tool also includes a related topic, identified as related to the primary topic, positioned around the primary topic, wherein the related topic is positioned in proximity to a distance indicator that corresponds with an extent of relatedness of the related topic to the primary topic. The method further includes in response to a selection of the related topic via the graphical user interface, causing display of a topic content snippet that provides a representation of the related topic. In this way, embodiments of this disclosure enable an improved user experience across a number of computer devices, applications and platforms. Further, in this way, embodiments, as described herein, cause certain topics related to a primary topic to be programmatically surfaced and presented without requiring computer resources for a user to manually perform operations to produce this outcome.

In any combination of the above embodiments of the computer-implemented method, the topic content snippet comprises text, an image, and/or a video that represents at least one search result corresponding with the related topic.

In any combination of the above embodiments of the computer-implemented method, the interactive search exploration tool is displayed based on a selection of a search exploration tool indicator presented in association with a set of search results displayed in response to execution of the search query.

In any combination of the above embodiments of the computer-implemented method, a first shape of the concentric shapes is a circular ring positioned a first distance from the primary topic, and a second shape of the concentric shapes is a circular ring positioned a second distance from the primary topic.

In any combination of the above embodiments of the computer-implemented method, the related topic comprises a general topic represented as a node.

In any combination of the above embodiments of the computer-implemented method, the related topic comprises a focused topic represented as a text query.

In any combination of the above embodiments of the computer-implemented method, the related topic includes a visual indication of the extent of relatedness of the related topic to the primary topic.

In any combination of the above embodiments of the computer-implemented method, the related topic includes a search icon that, when selected, initiates execution of a search of the related topic.

In any combination of the above embodiments of the computer-implemented method, the method further includes obtaining a selection of the topic content snippet result; and in response to the selection, causing presentation of more detailed information of the related topic.

In any combination of the above embodiments of the computer-implemented method, the related topic is identified as related to the primary topic based on analysis of a search query log or a set of web documents.

In other embodiments, a computer-implemented method is provided. The method includes obtaining a search query. The method also includes causing display, via a graphical user interface, of an interactive search exploration tool corresponding with the search query. The interactive search exploration tool includes a primary topic, indicating the search query, that is positioned at a center of the interactive search exploration tool. The interactive search exploration tool also includes a set of distance indicators indicating extents of relatedness to the primary topic, the set of distance indicators represented as concentric shapes positioned around the primary topic, with each shape of the concentric shapes indicating a different extent of relatedness to the primary topic. The interactive search exploration tool also includes a set of related topics, identified as related to the primary topic, positioned around the primary topic, wherein each related topic of the set of related topics is positioned in proximity to a distance indicator that corresponds with an extent of relatedness of the associated related topic to the primary topic. The method further includes in response to a selection of a particular related topic via the graphical user interface, updating the primary topic to be the particular related topic and adding a new related topic within the interactive search exploration tool that is related to the updated primary topic. In this way, embodiments of this disclosure enable an improved user experience across a number of computer devices, applications and platforms. Further, in this way, embodiments, as described herein, cause certain topics related to a primary topic to be programmatically surfaced and presented without requiring computer resources for a user to manually perform operations to produce this outcome. In any combination of the above embodiments of the computer-implemented method, the user selection comprises a selection of the at least the portion of code.

In any combination of the above embodiments of the computer-implemented method, in response to a selection of a particular related topic, the method further includes updating the set of related topics to include the new related topic and to reposition the updated set of related topics positioned around the updated primary topic based on relatedness to the updated primary topic.

In any combination of the above embodiments of the computer-implemented method, the set of related topics comprise a general topic represented by a node and a focused topic represented by a text query.

In any combination of the above embodiments of the computer-implemented method, each related topic of the set of related topics includes a visual indication of the extent of relatedness of the related topic to the primary topic.

In any combination of the above embodiments of the computer-implemented method, a selection of the new related topic causes display of a topic content snippet that provides a representation of the new related topic.

In other embodiments, one or more computer storage media having computer-executable instructions embodied thereon that, when executed by one or more processors, cause the one or more processors to perform a method is provided. The method includes identifying a primary topic based on an input or selection via a graphical user interface. The method also includes determining a set of topics related to the primary topic and an extent of relatedness of each topic to the primary topic based on analysis of web documents, a search query log, or a combination thereof. The method also includes causing display, via a graphical user interface, of an interactive search exploration tool corresponding with the search query. The interactive search exploration tool includes the primary topic positioned at a center of the interactive search exploration tool. The interactive search exploration tool also includes a set of distance indicators indicating a relatedness distance to the primary topic, the set of distance indicators represented as concentric shapes positioned around the primary topic, with each shape of the concentric shapes indicating a different relatedness distance to the primary topic. The interactive search exploration tool also includes the set of topics related to the primary topic positioned around the primary topic, wherein each topic of the set of topics is positioned in proximity to a distance indicator that corresponds with the extent of relatedness of the topic to the primary topic. The method further includes in response to a selection of a particular topic of the set of topics, causing initiation of display of a topic content snippet that provides a representation of the particular topic, execution of a search of the particular topic, or generation of an updated interactive search exploration tool that updates the primary topic to be the particular topic. In this way, embodiments of this disclosure enable an improved user experience across a number of computer devices, applications and platforms. Further, in this way, embodiments, as described herein, cause certain topics related to a primary topic to be programmatically surfaced and presented without requiring computer resources for a user to manually perform operations to produce this outcome. In any combination of the above embodiments of the computer-implemented method, the user selection comprises a selection of the at least the portion of code.

In any combination of the above embodiments of the media, the set of topics related to the primary topic and the extent of relatedness of each topic to the primary topic is determined using a topic graph generated based on the analysis of web documents, the search query log, or a combination thereof.

In any combination of the above embodiments of the media, the set of topics comprise a general topic represented by a node and a focused topic represented by a text query.

In any combination of the above embodiments of the media, each topic of the set of related topics includes a border thickness or depth of color visually indicating the extent of relatedness of the topic to the primary topic.

In any combination of the above embodiments of the media, the primary topic comprises a search query input via the graphical user interface, and wherein the interactive search exploration tool is displayed based on a selection of a search exploration tool indicator presented in association with a set of search results displayed in response to execution of the search query.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 15:
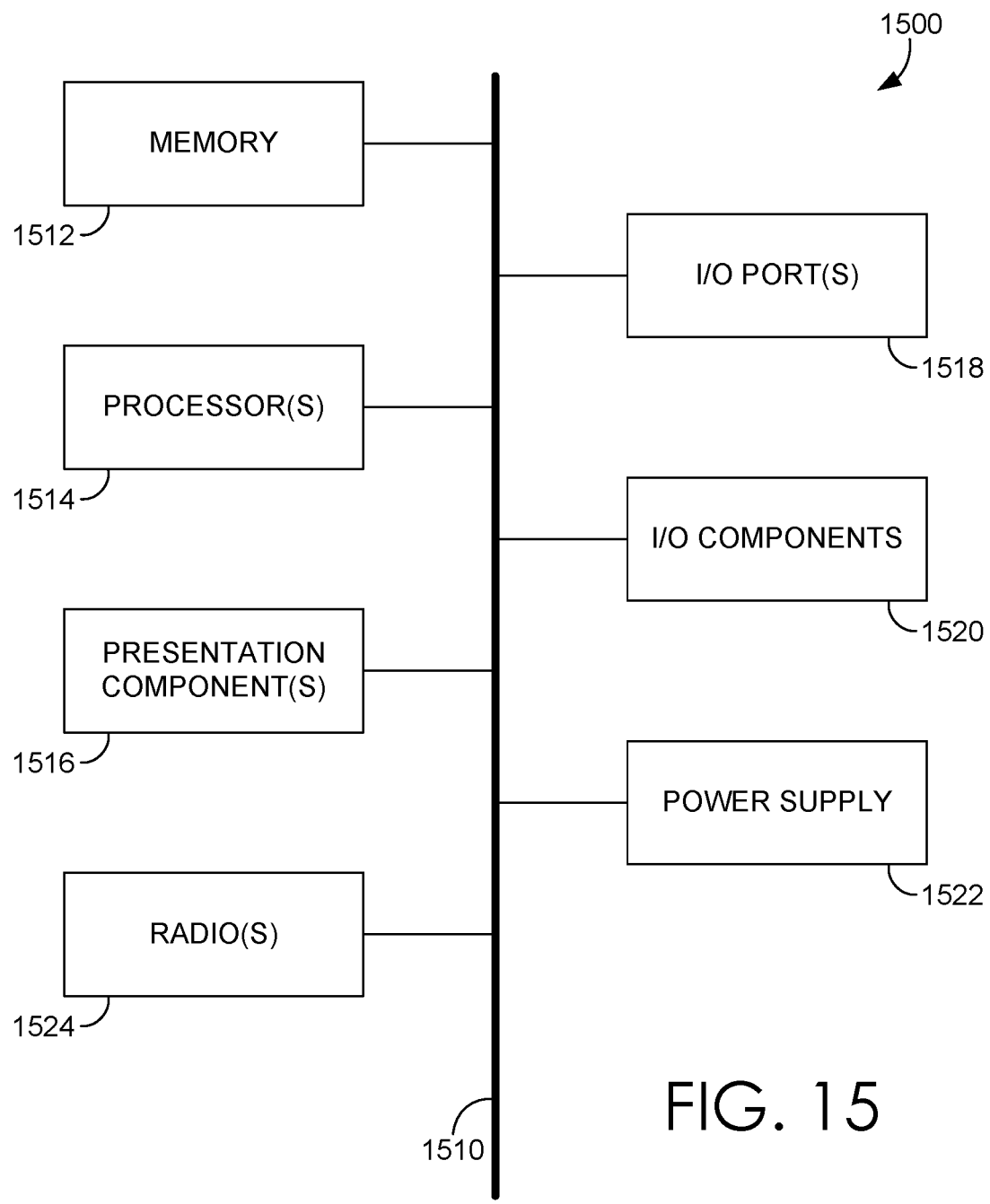
FIG. 15 is a block diagram of an exemplary computing environment suitable for use in implementing aspects of the technology described herein.

Referring to the drawings in general, and to FIG. 15 in particular, an exemplary operating environment for implementing aspects of the technology described herein is shown and designated generally as computing device 1500. Computing device 1500 is just one example of a suitable computing environment and is not intended to suggest any limitation as to the scope of use or functionality of the technology described herein. Neither should the computing device 1500 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 15, computing device 1500 includes a bus 1510 that directly or indirectly couples the following devices: memory 1512, one or more processors 1514, one or more presentation components 1516, input/output (I/O) ports 1518, I/O components 1520, an illustrative power supply 1522, and a radio(s) 1524. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 15 is merely illustrative of an exemplary computing device that can be used in connection with one or more aspects of the technology described herein. Distinction is not made between such categories as "workstation," "server," "laptop," and "handheld device," as all are contemplated within the scope of FIG. 15 and refer to "computer" or "computing device."

Computing device 1500 typically includes a variety of computer-readable media. Computer-readable media can be any available media that can be accessed by computing device 1500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1512 includes computer storage media in the form of volatile and/or nonvolatile memory. The memory 1512 may be removable, non-removable, or a combination thereof. Exemplary memory includes solid-state memory, hard drives, and optical-disc drives. Computing device 1500 includes one or more processors 1514 that read data from various entities such as bus 1510, memory 1512, or I/O components 1520. Presentation component(s) 1516 present data indications to a user or other device. Exemplary presentation components 1516 include a display device, speaker, printing component, and vibrating component. I/O port(s) 1518 allow computing device 1500 to be logically coupled to other devices including I/O components 1520, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1514 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 1000. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1500. The computing device 1500 may be equipped with depth cameras, such as stereoscopic camera systems, infrared camera systems, RGB camera systems, and combinations of these, for gesture detection and recognition. Additionally, the computing device 1500 may be equipped with accelerometers or gyroscopes that enable detection of motion. The output of the accelerometers or gyroscopes may be provided to the display of the computing device 1500 to render immersive augmented reality or virtual reality.

A computing device may include radio(s) 1524. The radio 1524 transmits and receives radio communications. The computing device may be a wireless terminal adapted to receive communications and media over various wireless networks. Computing device 1000 may communicate via wireless protocols, such as code division multiple access ("CDMA"), global system for mobiles ("GS"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computer-implemented method for presenting an interactive search exploration tool in a graphical user interface that is operating on a computer system, the method comprising:
   obtaining a search query;
   causing display, via the graphical user interface, of the interactive search exploration tool corresponding with the search query, the interactive search exploration tool including:
      a primary topic, indicating the search query, that is positioned at a center of the interactive search exploration tool;
      a set of distance indicators indicating extents of relatedness to the primary topic, the set of distance indicators represented as concentric shapes positioned around the primary topic, with each shape of the concentric shapes indicating a different extent of relatedness to the primary topic, where a first distance indicator of the set of distance indicators is determined based on a topic graph where nodes of the topic graph correspond to related topics corresponding to the primary topic and edges indicating an extent of relatedness between the nodes and the primary topic and includes one of a border thickness associated with a concentric shape positioned around the primary topic or a depth of a color associated with the concentric shape positioned around the primary topic; and
      a related topic, identified as related to the primary topic, positioned around the primary topic, wherein the related topic is positioned in proximity to the distance indicator that corresponds with an extent of relatedness of the related topic to the primary topic; and
   in response to a selection of the related topic via the graphical user interface, causing display of a topic content snippet that provides a representation of the related topic.

2. The computer-implemented method of claim 1, wherein the topic content snippet comprises text, an image, and/or a video that represents at least one search result corresponding with the related topic.

3. The computer-implemented method of claim 1, wherein the interactive search exploration tool is displayed based on a selection of a search exploration tool indicator presented in association with a set of search results displayed in response to execution of the search query.

4. The computer-implemented method of claim 1, wherein a first shape of the concentric shapes is a circular ring positioned a first distance from the primary topic, and a second shape of the concentric shapes is a circular ring positioned a second distance from the primary topic.

5. The computer-implemented method of claim 1, wherein the related topic comprises a general topic represented as a node.

6. The computer-implemented method of claim 1, wherein the related topic comprises a focused topic represented as a text query.

7. The computer-implemented method of claim 1, wherein the related topic includes a visual indication of the extent of relatedness of the related topic to the primary topic.

8. The computer-implemented method of claim 1, wherein the related topic includes a search icon that, when selected, initiates execution of a search of the related topic.

9. The computer-implemented method of claim 1 further comprising:
   obtaining a selection of the topic content snippet result; and
   in response to the selection, causing presentation of more detailed information of the related topic.

10. The computer-implemented method of claim 1, wherein the related topic is identified as related to the primary topic based on analysis of a search query log or a set of web documents.

11. A computer-implemented method comprising:
   obtaining a search query;
   causing display, via a graphical user interface, of an interactive search exploration tool corresponding with the search query, the interactive search exploration tool including:
      a primary topic, indicating the search query, that is positioned at a center of the interactive search exploration tool;
      a set of distance indicators indicating extents of relatedness to the primary topic based on a knowledge graph including a set of related topics represented by nodes in the knowledge graph and a set relationships between the primary topic and the set of related topics represented by edges between the nodes, the set of distance indicators represented as concentric shapes positioned around the primary topic, with each shape of the concentric shapes indicating a different extent of relatedness to the primary topic; and the set of related topics, identified as related to the primary topic, positioned around the primary topic, wherein each related topic of the set of related topics is positioned in proximity to a distance indicator that corresponds with an extent of relatedness of the associated related topic to the primary topic; and in response to a selection of a particular related topic via the graphical user interface, updating the primary topic to be the particular related topic and adding a new related topic within the interactive search exploration tool that is related to the updated primary topic.

12. The method of claim 11, wherein in response to a selection of a particular related topic, updating the set of related topics to include the new related topic and to reposition the updated set of related topics positioned around the updated primary topic based on relatedness to the updated primary topic.

13. The method of claim 11, wherein the set of related topics comprise a general topic represented by a node and a focused topic represented by a text query.

14. The method of claim 11, wherein each related topic of the set of related topics includes a visual indication of the extent of relatedness of the related topic to the primary topic.

15. The method of claim 11, wherein a selection of the new related topic causes display of a topic content snippet that provides a representation of the new related topic.

16. One or more computer storage media having computer-executable instructions embodied thereon that, when executed by one or more processors, cause the one or more processors to perform a method, the method comprising:

identifying a primary topic based on an input or selection via a graphical user interface;

determining a set of topics related to the primary topic and an extent of relatedness of each topic to the primary topic based on analysis of web documents, a search query log, or a combination thereof;

generating a topic graph based on the primary topic and the set of topics related to the primary topic, where nodes of the topic graph represent topics related to the primary topic of the set of topics related to the primary topic and edges of the topic graph represent an extent that the topics related to the primary topic of the set of topics is related to the primary topic;

causing display, via a graphical user interface, of an interactive search exploration tool corresponding with the search query, the interactive search exploration tool including:

the primary topic positioned at a center of the interactive search exploration tool, a set of distance indicators indicating a relatedness distance to the primary topic based on the edges of the topic graph, the set of distance indicators represented as concentric shapes positioned around the primary topic, with each shape of the concentric shapes indicating a different relatedness distance to the primary topic, and the set of topics related to the primary topic positioned around the primary topic based on the node of the topic graph, wherein each topic of the set of topics is positioned in proximity to a distance indicator that corresponds with the extent of relatedness of the topic to the primary topic; and in response to a selection of a particular topic of the set of topics, causing initiation of display of a topic content snippet that provides a representation of the particular topic, execution of a search of the particular topic, or generation of an updated interactive search exploration tool that updates the primary topic to be the particular topic.

17. The media of claim 16, wherein the set of topics related to the primary topic and the extent of relatedness of each topic to the primary topic is determined using a topic graph generated based on the analysis of web documents, the search query log, or a combination thereof.

18. The media of claim 16, wherein the set of topics comprise a general topic represented by a node and a focused topic represented by a text query.

19. The media of claim 16, wherein each topic of the set of related topics includes a border thickness or a depth of color visually indicating the extent of relatedness of the topic to the primary topic.

20. The media of claim 16, wherein the primary topic comprises a search query input via the graphical user interface, and wherein the interactive search exploration tool is displayed based on a selection of a search exploration tool indicator presented in association with a set of search results displayed in response to execution of the search query.

* * * * *